United States Patent
Mizer et al.

(10) Patent No.: US 10,351,319 B1
(45) Date of Patent: *Jul. 16, 2019

(54) ANGLED SPOUT ASSOCIATED WITH A TIMER FOR DISPENSING A CONTROLLED QUANTITY OF LIQUID COMPOSITION

(71) Applicant: The Procter & Gamble Company, Cincinnati, OH (US)

(72) Inventors: Scott Eugene Mizer, Loveland, OH (US); Nicole Lynn Briggs, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,259

(22) Filed: Jun. 18, 2018

(51) Int. Cl.
*B65D 47/40* (2006.01)
*G01F 13/00* (2006.01)

(52) U.S. Cl.
CPC ........... *B65D 47/40* (2013.01); *G01F 13/006* (2013.01); *B65D 2547/063* (2013.01)

(58) Field of Classification Search
CPC .... B65D 47/40; B65D 23/06; B65D 2547/06; B65D 2547/063; A47K 5/1202; G01F 11/006; G01F 11/262; G01F 11/0044; B05B 11/0044
USPC ........................................ 222/109, 570, 571
See application file for complete search history.

(56) References Cited

U.S. PATENT DOCUMENTS

| | | | | |
|---|---|---|---|---|
| 68,532 | A * | 9/1867 | Rooney | B65D 47/40 222/109 |
| 2,099,629 | A * | 11/1937 | Schaetzel | B65D 39/06 137/38 |
| 3,920,149 | A * | 11/1975 | Fortino | B67D 3/0006 222/1 |
| 4,054,026 | A | 10/1977 | Goodrich | |
| 4,353,489 | A * | 10/1982 | Arnold | B65D 47/127 222/570 |
| 4,550,862 | A * | 11/1985 | Barker | B65D 41/26 222/109 |
| 4,666,065 | A | 5/1987 | Ohren | |
| 4,741,459 | A * | 5/1988 | Silvenis | B65D 41/26 141/381 |
| 4,836,415 | A | 6/1989 | Grussmark | |
| 5,031,804 | A * | 7/1991 | Conrad | B65D 25/48 222/566 |
| 5,058,772 | A * | 10/1991 | Moore | B65D 47/122 222/109 |

(Continued)

FOREIGN PATENT DOCUMENTS

| | | |
|---|---|---|
| WO | WO2015097606 A3 | 10/2015 |
| WO | WO2018145645 A1 | 8/2018 |
| WO | WO2018147946 A1 | 8/2018 |

OTHER PUBLICATIONS

Homemade Water Clock, https://web.archive.org/web/20160522013315/https://teachbesideme.com/homade-water-clock/ May 22, 2016, 13 pages.

(Continued)

*Primary Examiner* — Benjamin R Shaw
(74) *Attorney, Agent, or Firm* — Gary J. Foose

(57) ABSTRACT

A fitment including a fitment body and a peripheral mount engaged with the fitment body. The fitment includes a timer and a spout oriented at an angle with respect to the mounting plane of the peripheral mount.

20 Claims, 13 Drawing Sheets

(56) References Cited

U.S. PATENT DOCUMENTS

| | | | |
|---|---|---|---|
| 5,457,665 A | 10/1995 | Reid | |
| 5,462,202 A * | 10/1995 | Haffner | B65D 41/26 222/109 |
| 5,505,349 A | 4/1996 | Peckels | |
| 5,566,862 A * | 10/1996 | Haffner | B65D 47/06 222/109 |
| 5,855,299 A * | 1/1999 | Arnold | B65D 47/122 222/109 |
| 5,941,422 A * | 8/1999 | Struble | B29C 65/0672 222/109 |
| 6,036,055 A * | 3/2000 | Mogadam | B67D 3/0006 222/1 |
| 6,926,179 B2 * | 8/2005 | Wagner, III | B65D 47/0842 222/481.5 |
| 7,306,121 B2 * | 12/2007 | Ophardt | B65D 47/065 222/209 |
| 7,845,524 B2 * | 12/2010 | Evans | G01F 11/262 222/1 |
| 9,428,374 B2 | 8/2016 | Houck | |
| 9,717,373 B2 | 8/2017 | Andrews | |
| 9,718,665 B2 | 8/2017 | Wittrup | |
| 2005/0103803 A1 * | 5/2005 | Hung | B65D 47/06 222/109 |
| 2006/0091152 A1 | 5/2006 | Evans | |
| 2006/0091153 A1 | 5/2006 | Evans | |
| 2006/0131330 A1 * | 6/2006 | Stebick | B65D 47/122 222/109 |
| 2007/0194047 A1 * | 8/2007 | Tauber | B65D 47/122 222/109 |
| 2009/0045224 A1 * | 2/2009 | Faaborg | B65D 41/0471 222/111 |
| 2010/0116776 A1 * | 5/2010 | Szekely | B65D 47/125 215/329 |
| 2010/0213211 A1 * | 8/2010 | Whaling | B65D 41/56 222/111 |
| 2011/0297698 A1 * | 12/2011 | Chiang | B65D 47/06 222/109 |
| 2013/0008919 A1 | 1/2013 | Honan | |
| 2013/0334246 A1 | 12/2013 | Houck | |
| 2014/0252034 A1 * | 9/2014 | Brannon | B65D 47/40 222/111 |
| 2015/0298875 A1 * | 10/2015 | Dagnelie | B65D 47/12 222/465.1 |
| 2017/0073115 A1 * | 3/2017 | Crawford | B65D 47/06 |
| 2018/0310778 A1 | 11/2018 | Smith | |
| 2019/0071299 A1 | 3/2019 | Briggs | |

OTHER PUBLICATIONS

Non-Final Office Action for U.S. Appl. No. 16/011,240, dated Dec. 28, 2018, 14 pages.

Notice of Allowance for U.S. Appl. No. 15/962,032, dated Mar. 18, 2019, 8 pages.

U.S. Appl. No. 16/011,240, filed Jun. 18, 2018, Briggs et al.

\* cited by examiner

ANGLED SPOUT ASSOCIATED WITH A TIMER FOR DISPENSING A CONTROLLED QUANTITY OF LIQUID COMPOSITION

FIELD OF THE INVENTION

Liquid composition dispensing.

BACKGROUND OF THE INVENTION

Many liquid compositions are dispensed from containers through an open end of the container or through a dispensing system that forms part of the closure for a container. For instance, liquid laundry products are commonly packaged in a container having a spout fitment fitted thereto and closure that engages with the spout fitment and or container. The closure often has a secondary purpose to function as a measuring cup and is provided with dosing indicia on the interior or exterior of the closure, the indicia having the form lines or bars marked on the closure that correspond with particular volumes of liquid that are desirable to use depending on the size of the load of laundry or other washing conditions.

Sometimes it can take some effort for the consumer to precisely dispense the desired amount of liquid laundry product into the dosing cup. If the consumer under-doses the product, he or she may be dissatisfied with the performance of the liquid laundry product because he or she failed to use an effective amount of the product. If the consumer over-doses the product, the consumer may be dissatisfied with the number of loads of laundry he or she can do with a single container of liquid laundry product.

There are a variety of devices that have a purpose of measuring the quantity of liquid dispensed from a container as the container dispenses the liquid. Measuring the quantity of liquid dispensed when pouring a liquid from a container is an exceptionally challenging task because the flow rate from the container may not be constant, air entering the container to replace the liquid displaced may result in irregular liquid flow from the container, and the dynamics of liquid flow through constrictions and possibly multiple pathways out of the container is complicated.

With these limitations in mind, there is a continued unaddressed need for apparatuses and process for dispensing a measured quantity of liquid.

SUMMARY OF THE INVENTION

A fitment comprising: a fitment body; a peripheral mount engaged with said fitment body, wherein said peripheral mount has a mounting plane; a spout having an upstream spout inlet and a downstream spout outlet and a spout wall extending from said spout inlet to said spout outlet, wherein said spout inlet has a spout inlet invert and said spout outlet has a spout outlet invert and a straight line connecting said spout inlet invert and said spout outlet invert is oriented at an angle from about 10 to about 85 degrees above said mounting plane; an immobile partial obstruction in line with and upstream of said spout outlet; a vent comprising an entrance spaced apart from said spout outlet and a vent wall extending from said entrance to an exit, wherein said exit is in fluid communication with said spout inlet; and a timer engaged with said fitment body, wherein said timer comprises a closed system containing a fixed volume of timer liquid; optionally, wherein said fitment further comprises a floor extending at least partially around said spout and outwardly away from said spout and a channel wall extending from said floor in a direction away from said spout inlet to define a drain back channel between said spout and said channel wall, wherein said floor is sloped to said entrance or to a hole in fluid communication with said spout inlet.

A fitment comprising: a fitment body; a peripheral mount engaged with said fitment body, wherein said peripheral mount has a mounting plane; a spout having an upstream spout inlet and a downstream spout outlet and a spout wall extending from said spout inlet to said spout outlet, wherein said spout inlet has a spout inlet invert and said spout outlet has a spout outlet invert and a straight line connecting said spout inlet invert and said spout outlet invert is oriented at an angle from about 10 to about 85 degrees above said mounting plane; an immobile partial obstruction in line with and upstream to said spout outlet; a vent comprising an entrance spaced apart from said spout outlet and a vent wall extending from said entrance to an exit, wherein said exit is in fluid communication with said spout inlet; and a timer engaged with said fitment body, wherein said timer comprises a position activated electronic timer; wherein said fitment further comprises a floor extending at least partially around said spout and outwardly away from said spout and a channel wall extending from said floor in a direction away from said spout inlet to define a drain back channel between said spout and said channel wall, wherein said floor is sloped to said entrance or to a hole in fluid communication with said spout inlet.

DETAILED DESCRIPTION OF THE INVENTION

Figure 1:
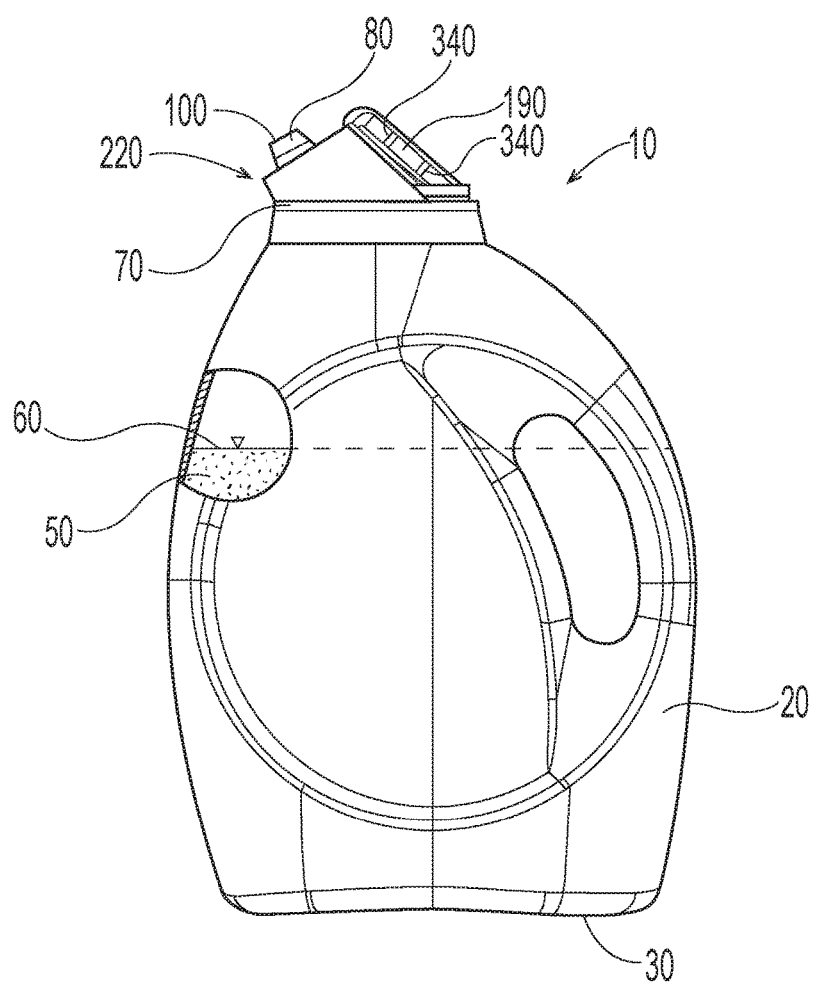
FIG. 1 is a container and fitment.

The container and fitment described herein can be particularly practical for dispensing liquid compositions. A container 10 is shown in FIG. 1. In use, the user tips the container body 20 to commence pouring of liquid composition 50 from within the container body 20. A timer 190 is engaged with the fitment body 70. The timer 190 is started when the container body 20 is tipped. While liquid composition 50 is being poured, the user watches the timer 190 until the signal occurs that an appropriate duration of pouring is complete. The duration of pouring is associated with a quantity of liquid composition 50 that is poured. When the user observes the signal from the timer 190 that the duration of pouring is complete, the user uprights the container body 20 to stop pouring. The timer 190 can have one or more dosing indicia 340 visible to the user. The dosing indicia 340 may be, by way of nonlimiting example, printed marks, raised portions, textured portions, opaque portions, semi-opaque portions, any of which may be associated with a numerical indicia associated with size or how dirty the load of laundry being washed or treated is or an indicator of load size such as a small basket and large basket.

The container body 20 can be of the type ordinarily employed for dispensing liquid compositions 50, such as an extrusion blow molded or injection blow molded polyethylene or polypropylene container body 20. The container body 20 can be a multilayer container body 20. The container body 20 can have a closed end 30 and an opposing open end. The closed end 30 or a portion of the closed end 30 can present a flat surface that is suitable for resting stably on a level surface such as a shelf or table.

The container body 20 can contain a liquid composition 50 in the interior of the container body 20. When the closed end 30 of the container body 20 is resting on a level surface, the liquid composition 50 has a phreatic surface 60.

The container 10 can have a fitment body 70 mounted to the open end. The fitment body 70 and the open end can be engaged with one another by a threaded connection, a snap-fit connection, a glued connection, a compression fitted connection, or any other type of connection, or combinations of the aforesaid connections, known in the art of connecting fitments or closures to the neck finish of a container body 20. The fitment body 70 can be a injection molded part, an additive manufactured part, or made by any other manufacturing approach known for making parts having complex shapes. The fitment body 70 can form at least part of a container body 20 closure system.

A spout 80 can be engaged with the fitment body 70. The spout 80 can have a spout invert that extends from the spout inlet to the spout outlet 100. The spout invert is the bottom of the interior of the spout 80 when liquid composition 50 is being dispensed through the spout 80. The term invert is used as it is used in the art of pipe flow, meaning the bottom of the interior of a pipe. As described herein, the spout 80 conducts or is designed to conduct flow of liquid composition 50 when the fitment body 70 is tipped. In use, the fitment 200 is connected to a container body 20 containing a liquid composition 50, such as a fabric treatment composition, so that the fitment body 70 is tipped when the container body 20 is tipped.

To provide for convenient pouring of liquid composition 50 from the container body 20 through the spout 80, it can be practical for the spout 80 to be angled relative to the phreatic surface 60 and or the fitment body 70. An angled spout 80 can help the user commence pouring of liquid composition 50 from the spout 80 without having to tip the container body 20 as far as might be necessary if the spout 80 was orthogonal to the phreatic surface 60. An angled spout 80 can be provided for by including the angled aspect in the fitment itself or providing for a container body 20 that has an angled neck finish, a combination of both of these features, or any other design approach that can provide for a spout 80 that is angled relative to the phreatic surface 60 within a container body 20 with which the spout 80 is engaged. It can be desirable to minimize how much the user has to tip the container body 20 to commence pouring of the liquid composition 50. Liquid compositions 50 are commonly provided in volumes from about 0.5 L to about 10 L and can have a specific gravity from about 0.8 to about 1.5. Thus, the mass of the liquid composition 50 to be tipped can be heavy to some users and users may appreciate the reduction in the angle to which they must tip the container body 20 to commence pouring.

The fitment and container 10 disclosed herein can be practical for dispensing a liquid composition 50 including, but not limited to, laundry detergent, fabric softener, fertilizer, cooking oil, petroleum oil, pesticides, and the like. The liquid composition (50) can have a viscosity from about 50 centipoise to about 2000 centipoise, optionally from about 100 centipoise to about 1500 centipoise.

Figure 2:
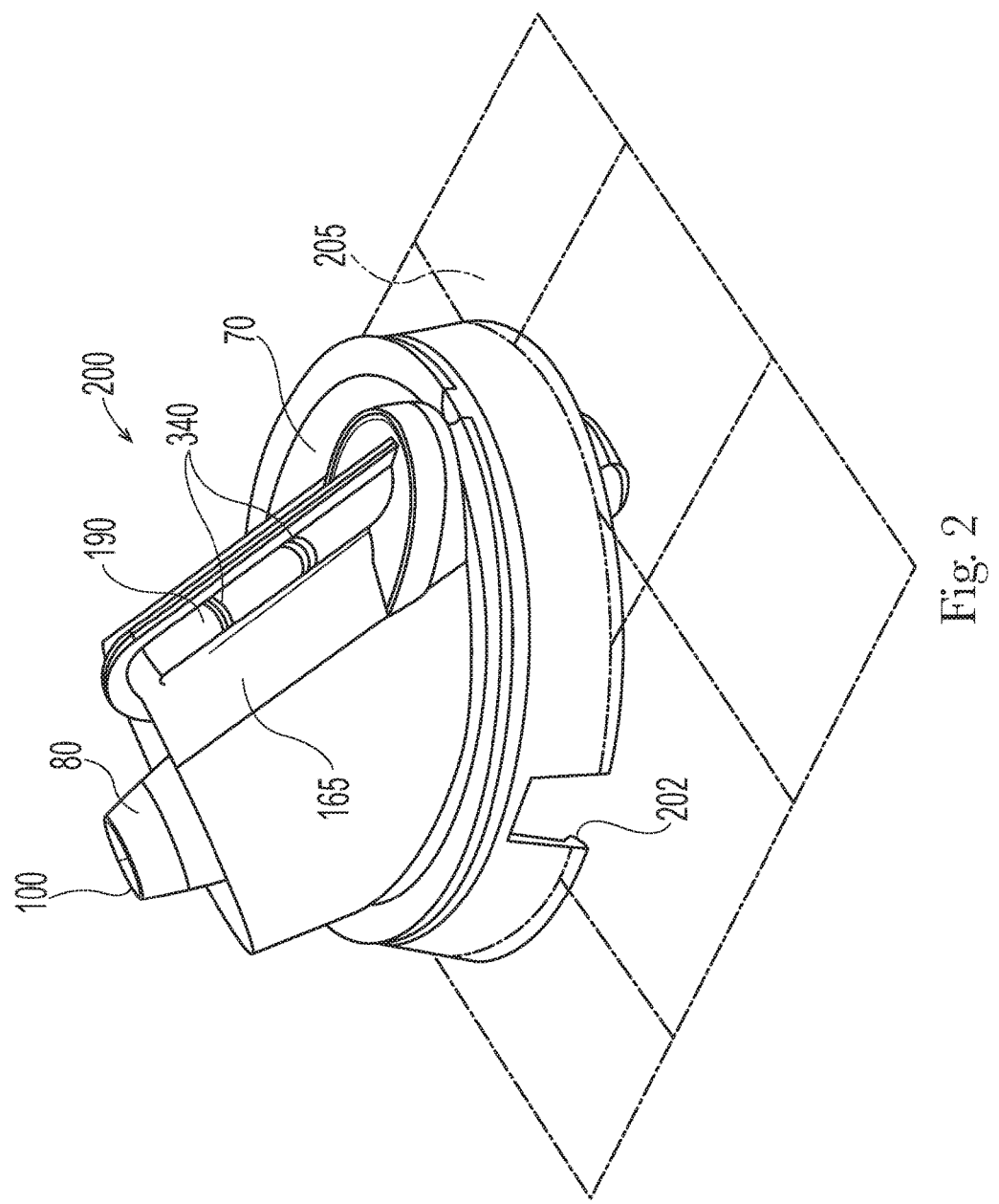
FIG. 2 is a fitment and the mounting plane of the fitment is shown.

The fitment 200 can comprise a fitment body 70 and a peripheral mount 202 engaged with the fitment body 70 (FIG. 2). The peripheral mount 202 can have a mounting plane 205. The mounting planning 205 is rendered in dot dashed lines to illustrate the position of the mounting plane 205. The mounting plane 205 is the plane in which the peripheral mount 202 is configured and sized and dimensioned to fit to a neck finish of a container body 20 or fit to a part engaged with the neck finish of a container body 20. The mounting plane 205 is descriptive of the position in space in which the peripheral mount 202 is designed to fit with a neck finish of a container body 20. The mounting plane 205 can be defined by the bottom of a slot sized and dimensioned to fit to a neck finish of a container. The mounting plane 205 can be defined by a stop provided on the fitment body 70 or peripheral mount 202 to prevent further engagement of a threaded peripheral mount 202 and corresponding threads on a neck finish of a container body 20 or corresponding threads on a part that is engaged with the neck finish of a container body 20. The mounting plane 205 can be defined by a stop provided on the fitment body 70 or peripheral mount 202 to limit how far the peripheral mount 202 can be inserted into a neck finish or inserted into a part that that is engaged with the neck finish. The mounting plane 205 can be defined by a plane from which a thread or threads that are part of the peripheral mount 202 extend.

Figure 3:
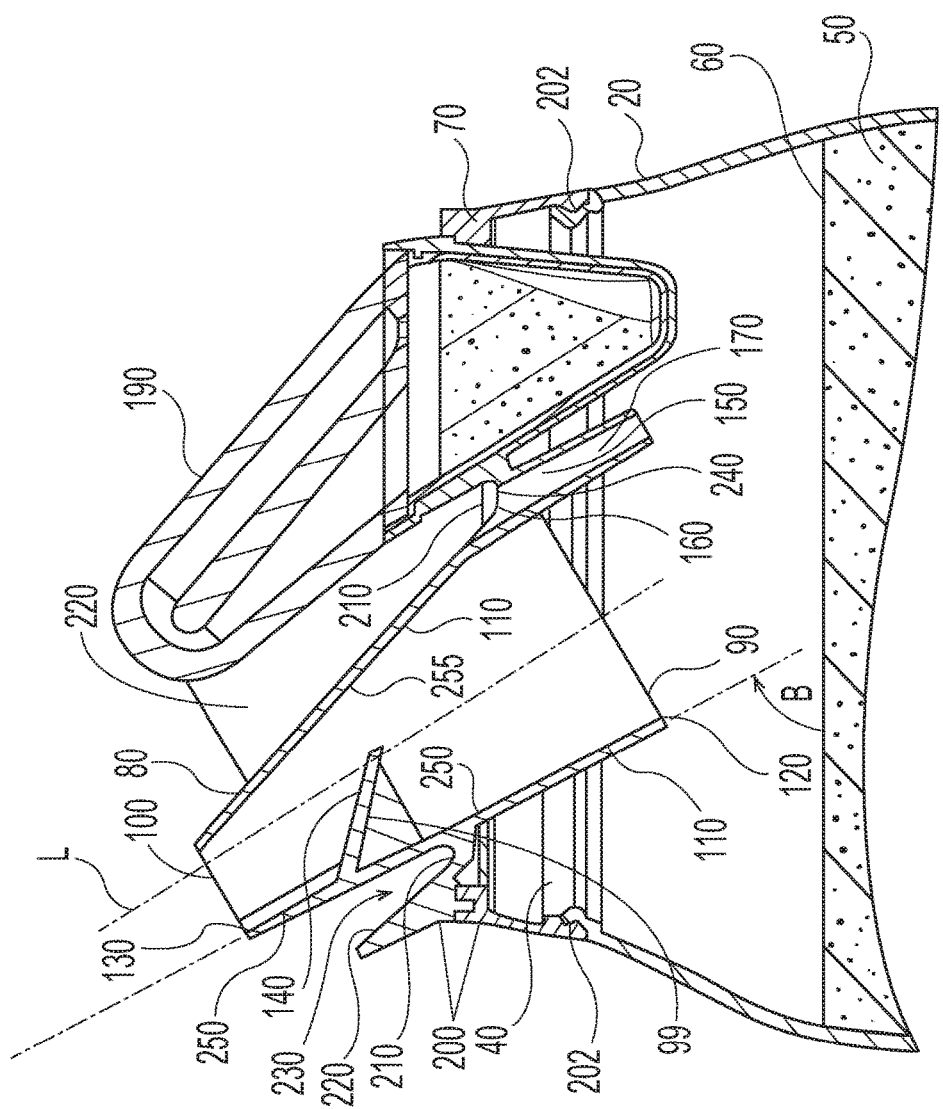
FIG. 3 is a cross section of a fitment and a portion of a container.

A straight line connecting the spout inlet invert 120 and the spout outlet invert 130 can be oriented at an angle from about 10 degrees to about 85 degrees from above the mounting plane 205. Optionally, a straight line connecting the spout inlet invert 120 and the spout outlet invert 130 can be oriented at an angle from about 30 degrees to about 85 degrees from above the mounting plane 205. Optionally, a straight line connecting the spout inlet invert 120 and the spout outlet invert 130 can be oriented at an angle from about 50 degrees to about 85 degrees from above the mounting plane 205. Optionally, a straight line connecting the spout inlet invert 120 and the spout outlet invert 130 can be oriented at an angle from about 60 degrees to about 80 degrees from above the mounting plane 205. A spout 80 can be engaged with the fitment body 70, as shown in FIG. 3. The spout 80 can have an upstream spout inlet 90 and a downstream spout outlet 100. A spout wall 110 can extend from the spout inlet 90 to the spout outlet 100. The terms upstream and downstream refer to directions within the spout 80 when liquid composition 50 is flowing within the spout 80 from the spout inlet 90 towards the spout outlet 100.

The spout 80 can be tapered from the spout inlet 90 to the spout outlet 100. This can help to maintain full flow through the spout 80 from the spout inlet 90 to the spout outlet 100. The variability of flow through the spout 80 as a function of the angle at which the spout 80 is tipped may be less when there is full flow through the spout 80 than when flow through the spout 80 is open channel flow along the interior length of the spout 80 or a portion thereof.

The spout inlet 90 can have a spout inlet invert 120. The spout outlet 100 can have a spout outlet invert 130. During pouring of liquid composition 50 from the spout 80, the spout inlet invert 120 and spout outlet invert 130 are at the bottom of the interior facing surface of the spout wall 110.

When the fitment body 70 is engaged on the open end 40 of the container body 20, a straight line connecting the spout inlet invert 120 and the spout outlet invert 130 can be oriented at an angle from about 10 degrees to about 85 degrees above the phreatic surface 60. Optionally, a straight line connecting the spout inlet invert 120 and the spout outlet invert 130 can be oriented at an angle from about 30 degrees to about 85 degrees above the phreatic surface 60. Optionally, a straight line connecting the spout inlet invert 120 and the spout outlet invert 130 can be oriented at an angle from about 50 degrees to about 85 degrees above the phreatic surface 60. Optionally, a straight line connecting the spout inlet invert 120 and the spout outlet invert 130 can be oriented at an angle from about 60 degrees to about 80 degrees above the phreatic surface 60. The angle can be an angle of $\beta$ as illustrated and measured from the phreatic surface 60. If the neck finish of the open end 40 is parallel to or substantially parallel to the phreatic surface 60 when the closed end 30 of the container body 20 is resting on a level surface, the fitment body 70 can be mounted to the neck finish of the open end 40 and the angle of the spout 80 can be provided for by designing the fitment 200 so that the spout 80 is angled relative to the neck finish of the open end 40 of the container body 20 to which the fitment 200 is engaged.

The fitment 200 comprises the fitment body 70, a peripheral mount 202 engaged with the fitment body 70, the spout 80, and the timer 190. The fitment 200 can be engaged with the open end 40 of the container body 20 by the peripheral mount 202. The timer can be engaged with an outer surface 165 of the fitment body 20.

The fitment 200 shown in FIG. 3 is a nonlimiting example of a fitment 200 providing for an angled spout 80 when used with a container body 20 having a neck finish of the open end 40 that is parallel to or substantially parallel to phreatic surface 60 when the closed end 30 of the container body 20 is resting on a level surface.

The open end 40 can have an open end diameter of from about 10 mm to about 100 mm, optionally from about 20 mm to about 60 mm, optionally from about 20 mm to about 50 mm.

An immobile partial obstruction 140 can be provided in line with and upstream of the spout outlet 100. The immobile partial obstruction 140 can be engaged with an interior surface of the spout 80 or another portion of the fitment 200, for example the fitment body 70.

The partial obstruction 140 can be a structure that blocks flow of liquid composition 50 from edge to edge of the flow path when the fitment 200 is in a position to dispense liquid composition 50. Optionally, the partial obstruction 140 can be a structure that resists flow of liquid composition 50, forcing liquid composition 50 to flow around the partial obstruction 140 before reaching the spout inlet 90. For instance, the partial obstruction 140 can be an obstruction in the pathway of flow of the liquid composition 50. That is, liquid composition 50 may flow over the top of and or around the sides of the partial obstruction 140. The partial obstruction 140 can be positioned so that it is in line with the spout inlet 90. The partial obstruction 140 can be positioned to be in line with the centerline of the spout inlet 90. The partial obstruction 140 can be positioned so that it locally diverts at or near the spout inlet 90 stream lines of liquid composition 50 flowing from the spout inlet 90 downstream to the spout outlet 100. The partial obstruction 140 can act to divert streamlines of liquid composition 50 that flow from the spout inlet 90 downstream to the spout outlet 100, and in particular divert or lengthen streamlines of liquid composition 50 flowing at or near the spout inlet 90.

The partial obstruction 140 can be positioned in the spout 80 between the spout inlet 90 and the spout outlet 100. Liquid composition 50 from the container body 20 passes from the container body 20, through the spout inlet 90, over, and/or around, and/or past the partial obstruction 140, and through the spout outlet 100. The partial obstruction 140 can be in the interior of the spout 80. The partial obstruction 140 can help to reduce the influence of the total head upstream of the partial obstruction 140 on the flow rate of the liquid composition 50 past the partial obstruction 140 and can have a comparatively large or even greater effect on flow rate out of the spout outlet 100 than the shape of the spout 80, the surface roughness of the spout wall 110, and total head above the partial obstruction 140 when the container 10 is in a position in which liquid composition 50 is dispensed from the container 10.

The partial obstruction 140 reduces the open cross sectional area within the fitment 200 where the partial obstruction 140 is positioned as compared to a position immediately upstream of the partial obstruction 140. The partial obstruction can be positioned at the spout inlet 90, immediately upstream of the spout inlet 90, or upstream of the spout inlet 90. The partial obstruction 140 can be positioned within the spout 80 nearer to the spout inlet 90 than to the spout outlet 100. The partial obstruction 140 can be positioned within the spout 80 nearer to the spout outlet 100 than to the spout inlet 90.

The partial obstruction 140 can be positioned so that it has an effect or even large effect, or even a significant effect on the flow of liquid composition 50 through the spout 80. That is, the partial obstruction 140 can have a comparatively larger effect on flow of the liquid composition 50 out of the spout 80 than other features within or defining the spout wall 110 upstream of the partial obstruction 140. A function of the partial obstruction 140 is to provide for a structural feature that has a substantial impact on the flow rate of liquid composition 50 out of the spout outlet 100, which can serve to reduce the impact of total head of the liquid composition 50 above the spout inlet 90 or partial obstruction 140 on the flow rate of the liquid composition 50 out of the spout outlet 100.

The partial obstruction 140 can reduce the open cross sectional area of the spout 80 by more than about 10%, optionally more than about 20%, further optionally more than about 30%, where the partial obstruction 140 is positioned as compared to a position immediately upstream of the partial obstruction as measured parallel to the mounting plane 205.

The partial obstruction 140 can be positioned nearer to the spout outlet 100 than the spout inlet 90. This is thought to provide for continual collection in the spout 80 of a sufficient quantity of liquid to provide nearly a constant flow rate of liquid composition 50 past the partial obstruction 140 towards the spout outlet 100. The partial obstruction 140 can block more than about 10% of the open cross sectional area of the spout 80 at the location where the partial obstruction 140 is positioned. The partial obstruction 140 can block more than about 20% of the open cross sectional area of the spout 80 at the location where the partial obstruction 140 is positioned. The partial obstruction 140 can block more than about 30% of the open cross sectional area of the spout 80 at the location where the partial obstruction 140 is positioned. The partial obstruction 140 can block more than about 40% of the open cross sectional area of the spout 80 at the location where the partial obstruction 140 is positioned. The partial obstruction 140 can block more than about 50% of the open cross sectional area of the spout 80 at the location where the partial obstruction 140 is positioned. The partial obstruction 140 can block more than about 60% of the open cross sectional area of the spout 80 at the location where the partial obstruction 140 is positioned. The more the partial obstruction 140 blocks flow, the more likely it is that a sufficient volume of liquid composition 50 will be behind the partial obstruction 140 to support steady flow over or past the partial obstruction 140 and the slower the liquid composition 50 will flow out the spout outlet 100. The percentage of the open cross sectional area can be measured parallel to the mounting plane 205.

The partial obstruction 140 can have a partial obstruction face area that is more than about 20% of the open cross section area of the spout outlet 100. The partial obstruction face area is measured as the projected area of the partial obstruction presented downstream towards the spout outlet 100. The partial obstruction face area can be from about 50 mm$^2$ to about 200 mm$^2$, optionally about 80 mm$^2$ to about 160 mm$^2$, optionally about 100 mm$^2$ to about 140 mm$^2$, optionally about 120 mm$^2$. The partial obstruction 140 can have a partial obstruction face area that is more than about 30%, optionally more than about 40%, optionally more than about 50%, optionally more than about 70%, optionally more than about 90% of the open cross section area of the spout outlet 100. The partial obstruction 140 can be located from about 1 mm to about 40 mm, or optionally 10 mm to about 30 mm, or optionally about 15 mm to about 25 mm from the spout outlet 100, or optionally about 20 mm from the spout outlet 100, or optionally from about 1 mm to about 6 mm, or optionally about 1 mm to 4 mm from the spout outlet 100.

At least a portion of the partial obstruction 140 can intersect a straight longitudinal axis L passing through the spout outlet 100 and orthogonal to the spout inlet 90. Arranged as such, when a user looks down through the spout outlet 100 (looking from outside the fitment 200 in the upstream direction), at least a portion of the partial obstruction 140 can obstruct or partially obstruct the view of the spout inlet 90. The spout 80 can be a straight spout through which a straight longitudinal axis L can pass without intersecting the spout wall 110. Optionally, the spout 80 can be curved such that a straight longitudinal axis L cannot pass through the spout 80 without intersecting the spout wall 110.

The spout 80 can have an invert interior contour 250 extending from the spout inlet invert 120 to the spout outlet invert 130. The invert interior contour 250 is the invert of the spout 80 at positions between the spout inlet 90 and the spout outlet 100. The partial obstruction 140 can be along the invert interior contour 250. Arranged as such, the partial obstruction 140 can be between the spout inlet 90 and the spout outlet 100. When the liquid composition 50 is dispensed from the spout 80, the partial obstruction 140 can be located in the bottom portion of the spout 80. The streamlines of flow of liquid composition 50 at or near the bottom of the spout will be diverted over and or around the partial obstruction 140, thereby increasing the resistance to flow as compared to a spout 80 devoid of the partial obstruction 140.

Optionally, the partial obstruction 140 can be along the obvert interior contour 255. The obvert interior contour is the top of the interior of a pipe and is opposite the invert interior contour 250. Such a configuration may initiate an earlier onset of pouring from the spout 80. In such an arrangement, the partial obstruction 140 can be interior to the spout 80 on the same side of the interior of the spout wall 110 as the timer 190.

The partial obstruction 140 can present a substantially flat surface 99 towards the spout inlet 90. A substantially flat surface 99 can provide for a greater resistance to liquid flow since stream lines of liquid flow are diverted to a greater degree than if the upstream surface of the partial obstruction 140 presents a convex surface upstream, which may be an more aerodynamic shape.

The partial obstruction 140 can be positioned from about 5 mm to about 40 mm away from the spout outlet 100, optionally from about 5 mm to about 20 mm away from the spout outlet 100.

In general, the desired dispensing rate of liquid composition 50 from the container 10 is from about 10 mL/s to about 60 mL/s, optionally from about 15 mL/s to about 25 mL/s.

The fitment body 70 can be provided with a drain-back feature. A drain-back feature can be practical for catching drips from the spout outlet 100 when the consumer is finished dispensing from the container body 20. The drain-back feature can comprise a floor 210 extending at least partially around the spout 80 and outwardly away from the spout 80. The drain-back feature can further comprise a channel wall 220 extending from the floor 210 in a direction away from the spout inlet 90 to define a drain back channel 230 between the spout 80 and the channel wall 220. The floor 210 can be sloped to the entrance 160 or to a hole 240 in fluid communication with the spout inlet 90. The entrance 160 or hole 240 can be in fluid communication with the spout inlet 90 via the interior of the fitment 200 or fitment body 70. The entrance 160 or hole 240 can be in fluid communication with the spout inlet 90 via a pathway other than through the spout outlet 100 or around the exterior of the fitment body 70. The floor 210 can be sloped at an angle from horizontal of from about 5 degrees to about 45 degrees relative to the phreatic surface 60 or peripheral mount 202 or mounting plane 205. The drain back channel 230 can be described as being exterior to the spout 80. The drain back channel 230 can be further described as being beneath the spout outlet 100. The drain back channel 230 can further be described as positioned between the spout 80 and the channel wall 220.

The drain-back feature can also serve as the vent 150. Optionally, the drain-back feature can be separate from the vent 150.

Figure 4:
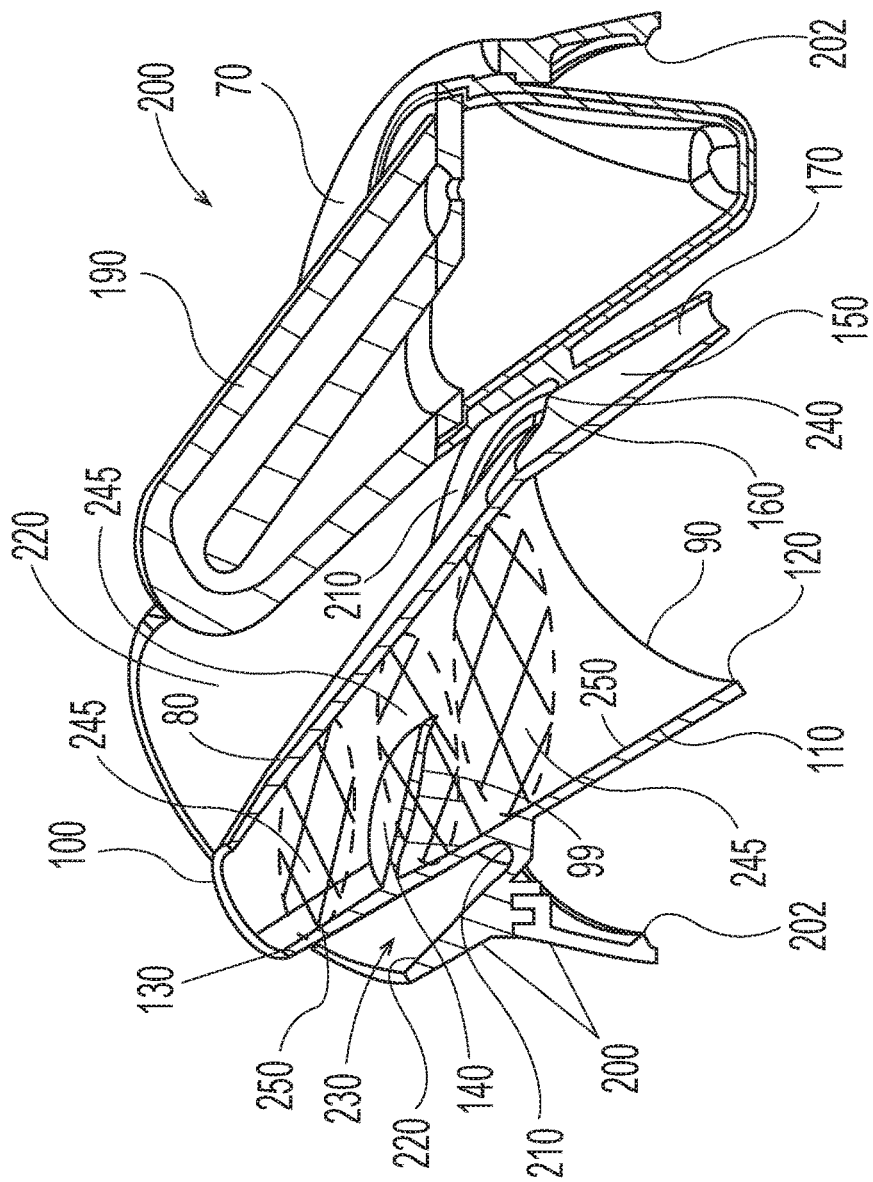
FIG. 4 is a cross section of fitment, the full interior sections of the spout being shown in cross hatching in the spout.

The spout 80 can comprise a plurality of full interior sections 245 parallel to the phreatic surface 60 between the spout inlet 90 and the spout outlet 100 (FIG. 4). The full interior sections 245 not inclusive of the partial obstruction 140 can decrease in full interior section area from the spout inlet 90 to the spout outlet 100. The full interior sections 245 not inclusive of the partial obstruction 140 means the full interior sections 245 are measured as if the partial obstruction 140 is not present. That is, whatever portions of the full interior sections 245 that would be occupied by part of the partial obstruction 140 are not subtracted out. Rather the full interior sections 245 are measured as if the partial obstruction 140 does not exist. For example, if the full interior section 245 is a circular section and part of that section is occupied by part of the partial obstruction 140, then the full interior section area would be pi multiplied by the diameter of the full interior circular section. Such a structure provides for an overall spout 80 structure in which the interior of the spout 80 is tapered as a function of position from the spout inlet 90 to the spout outlet 100. This can help to maintain full flow through the spout 80 from the spout inlet 90 to the spout outlet 100 in use.

The spout 80 can have a shape selected from the group consisting of a truncated oblique circular cone, a truncated right circular cone, a truncated generalized oblique cone, and a truncated generalized right cone. The spout 80 can be substantially conically shaped. The spout 80 can be a tapered shape.

Figure 5:
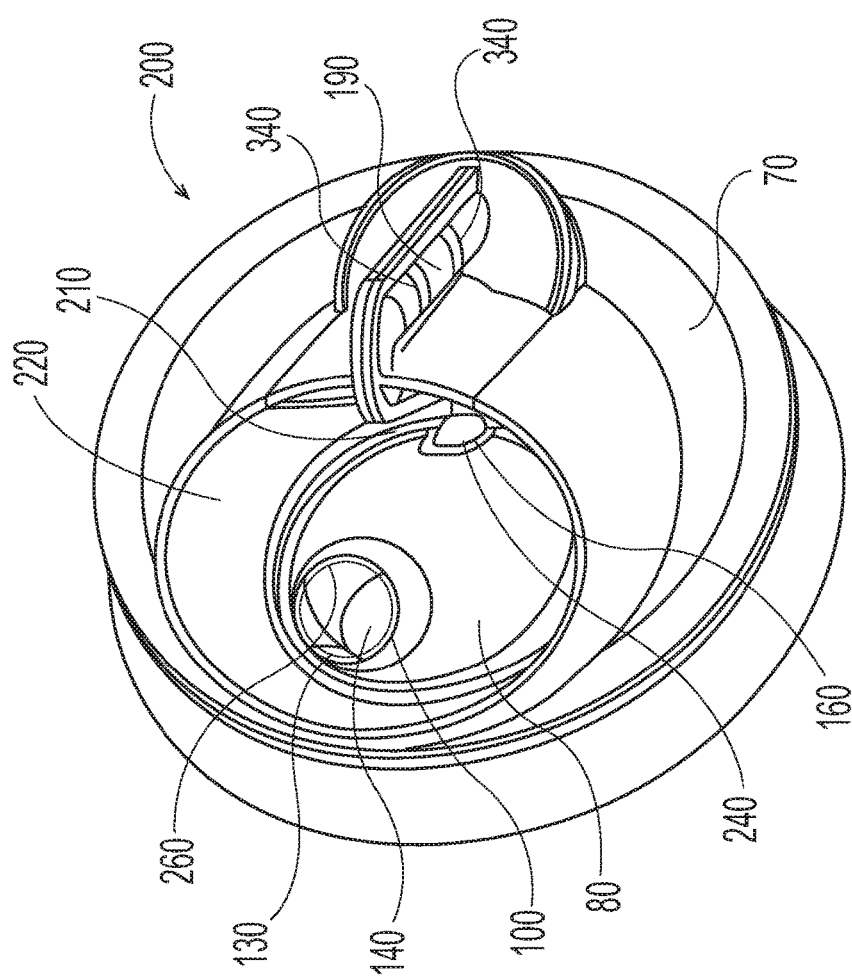
FIG. 5 is a top view of a fitment.

The spout outlet 100 has a spout outlet perimeter 260 (FIG. 5). The spout outlet perimeter 260 is the interior perimeter of the spout outlet 100. The spout outlet perimeter 260 is a scalar quantity. The spout outlet perimeter 260 can be from about 6 mm to about 60 mm, optionally from about 8 mm to about 30 mm, optionally from about 10 mm to about 20 mm. The smaller the spout outlet perimeter 260 the more constricted the flow of liquid composition 50 will be after it exits the spout outlet 100. The spout outlet 100 can be circular or substantially circular and have a diameter from about 25 mm to about 100 mm, optionally from about 30 mm to about 80 mm, optionally from about 35 mm to about 75 mm. For non-circular spout outlets 100 the aforesaid diameters can be effective diameters, the effective diameter being the diameter of a circle having the same open area at the spout outlet 100. The spout can have generally circular or circular open full interior sections 245. The spout 80 can be an oval shaped truncated conical shape.

Figure 6:
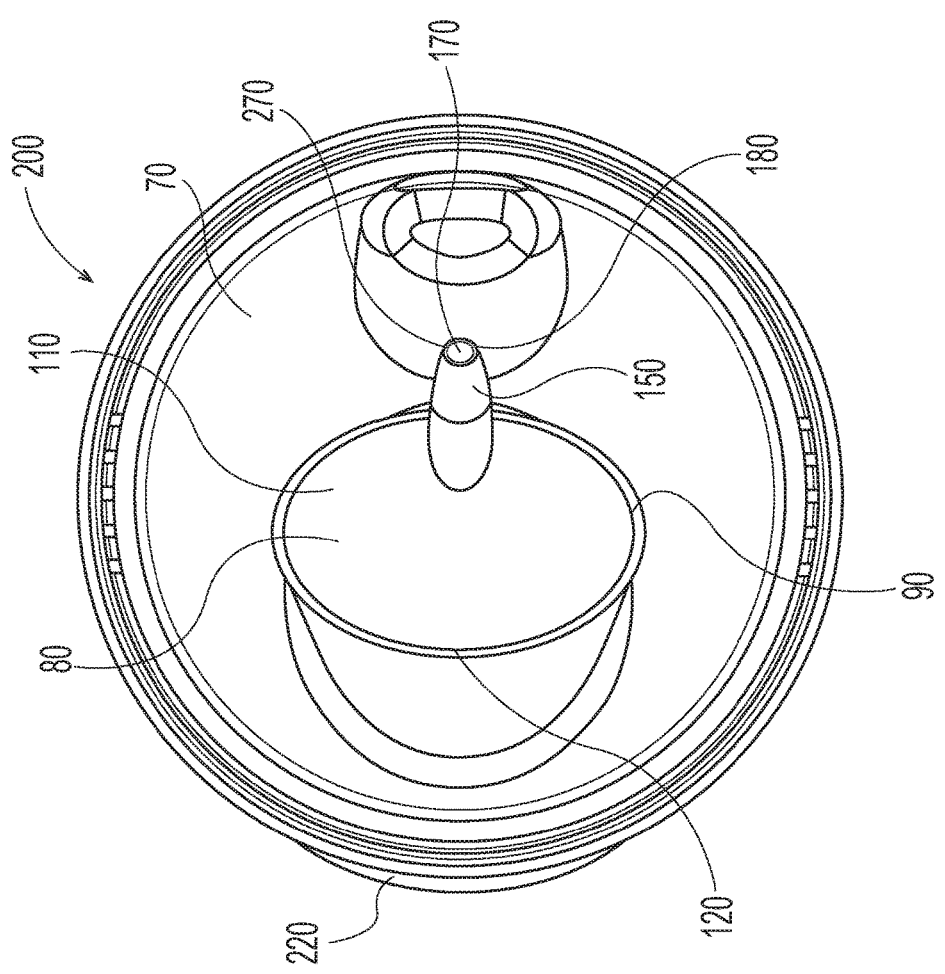
FIG. 6 is a bottom view of a fitment.

The fitment body 70 can comprise a vent 150 (FIG. 6). The vent 150 can comprise a vent entrance 160 exterior to the spout outlet 100 and a vent wall 170 extending from the vent entrance 160 to an exit 180. That is, the vent entrance 160 can be spaced apart from the spout outlet 100. The vent entrance 160 can have an area of from about 5 mm$^2$ to about 50 mm$^2$, optionally from about 20 mm$^2$ to about 30 mm$^2$, optionally about 28 mm$^2$. The vent entrance 160 only needs to be large enough to permit a sufficient quantity of air to flow back into the container body 20 as liquid composition 50 is emptied from the container body 20 so that the air pressure within the container body 20 is equalized with the ambient air pressure.

The exit 180 can be in fluid communication with the spout inlet 90. The exit 180 can be in fluid communication with the spout inlet 90 via the interior of the fitment 200 or fitment body 70. The exit 180 can be in fluid communication with the spout inlet 90 via a pathway other than through the spout outlet 100 or around the exterior of the fitment body 70. The vent 150 provides for pathway for air from the external environment to enter into the container body 20 to replace the liquid composition 50 dispensed from the container body 20. The vent 150 can be separated from the spout outlet 100 so that flow of liquid composition 50 from the spout outlet 100 does not interfere with venting of the container body 20. To provide for steady flow of liquid composition 50 from the spout outlet 100 and steady flow of air back into the container body 20 the liquid flow from the spout outlet 100 can be independent of the air entry into the vent entrance 160 of the vent 150.

The exit 180 can be more distant from the partial obstruction 140 than the spout outlet 100 is from the partial obstruction 140. This may help reduce the impact of air passing through the vent 150 and out the exit 180 from interfering with flow of liquid composition 50 past the partial obstruction 140. This in turn can help provide for a sufficiently steady flow rate of liquid composition 50 past the partial obstruction 140 and out the spout outlet 100. Separating the flow past the partial obstruction 140 from bubbles entering the container through the vent 150 reduces the impact of air entering the container body 20 on flow rate of liquid composition 50 out of the container body 20.

The exit 180 can be more than about 0.5 times the spout outlet perimeter 260 away from the partial obstruction 140. This may also help separate venting of air back into the container body 20 from liquid composition 50 being discharged from the spout outlet 100. The spatial relationship of exit 180 and the partial obstruction 140 is taken to be the minimum straight line distance between the partial obstruction 140 and the interior wall of the exit 180.

The exit 180 can be more than about 1.5 times more distant from the partial obstruction 140 than the spout outlet 100 is from the partial obstruction 140. This may be helpful by providing enough distance between the partial obstruction 140 and the exit 180 so that air being vented back into the container body 20 has little or no effect on the flow of liquid being dispensed from the container body 20 past the partial obstruction 140.

The exit 180 can have an exit perimeter 270. The exit perimeter 270 is the interior perimeter of the vent wall 170 at the exit 180. The spout outlet perimeter 260 can be more than about 2 times greater than the exit perimeter 270. The exit perimeter 270 can be from about 0.1 mm to about 12 mm. The exit perimeter 270 can be from about 1 mm to about 12 mm. The exit perimeter 270 can be from about 2 mm to about 4 mm. The exit perimeter 270 can be about 3.8 mm. A smaller exit perimeter 270 can be practical for reducing the potential for a double pour, which is a situation in which liquid composition 50 is discharged from the spout outlet 100 and the entrance 160 of the vent. The capillary force of the liquid composition 50 can resist entry into the exit 180. The spout outlet perimeter 260 can be from about 1 mm to about 60 mm, optionally from about 1 mm to about 20 mm, optionally from about 2 mm to about 10 mm. In general, the lower the viscosity of the liquid composition 50 the smaller the exit 180 should be.

The ratio between the spout outlet perimeter 260 and the exit perimeter 270 can be from about 2:1 to about 20:1. Having the outlet perimeter 260 much larger than the exit perimeter 270 can reduce the potential for the liquid composition 50 to pour out of both the spout outlet 100 and the entrance 160 of the vent 150. The smaller the exit perimeter 270, the less likelihood of liquid composition 50 product entering the vent 150 since capillary forces in the liquid composition 50 will resist entry of the liquid composition 50 into the exit 180 of the vent 150. The ratio between the spout outlet perimeter 260 and the exit perimeter 270 can be from about 3:1 to about 15:1, optionally about 3:1 to about 5:1, or optionally about 10:1. The greater the kinematic viscosity of the liquid composition 50, the larger the ratio between the spout outlet perimeter 260 and exit perimeter 270 can be. The exit 180 can have an area from about 1 mm$^2$ to about 30 mm$^2$, optionally about 2 mm$^2$ to about 20 mm$^2$, optionally from about 3 mm$^2$ to about 10 mm$^2$, optionally about 7 mm$^2$. The exit 180 can have a diameter of from about 0.5 mm to about 5 mm, optionally about 1 mm to about 3 mm.

Figure 7:
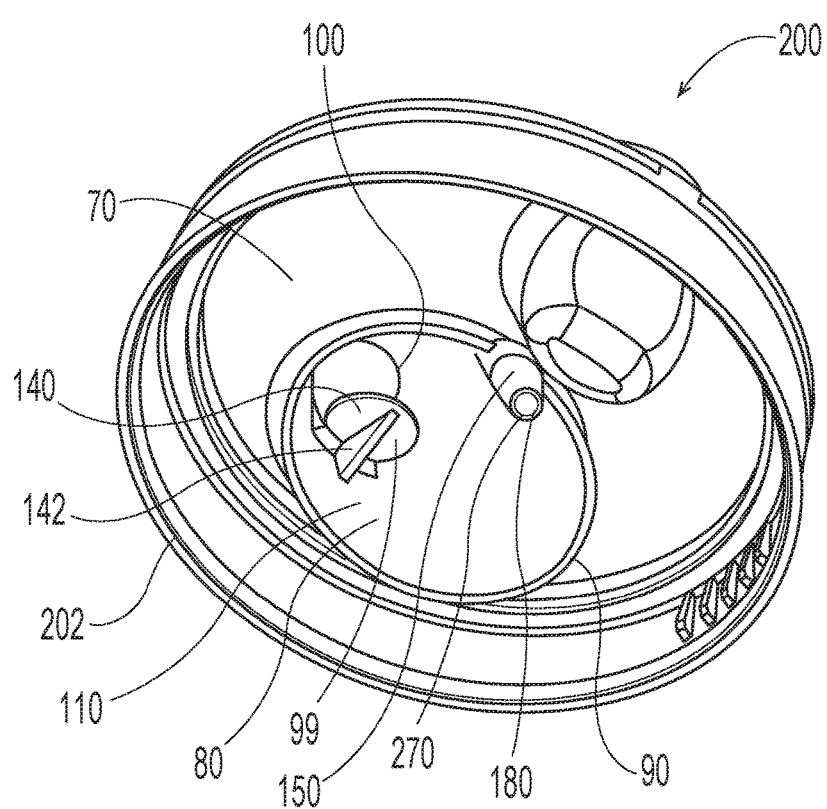
FIG. 7 is a bottom view of a fitment.

A bottom view of a fitment body 70 is shown in FIG. 7. As shown in FIG. 7, the partial obstruction 140 can be flat plate that is tilted towards the upstream direction. The partial obstruction 140 can be supported by a supporting strut 142 that connects the partial obstruction 140 to the spout wall 110.

Timer

The container 10 and fitment 200 can further comprise a timer 190 engaged with the fitment body 70. The timer 190 can be hydraulically isolated from the exit 180, the spout outlet 100, and or both the exit 180 and the spout outlet 100. Said otherwise, the timer 190 can be free of fluid communication between the timer 190 and spout outlet 100. The timer 190 can be engaged with the fitment body 70. The timer 190 can be engaged with the fitment body 70 by being mounted on an outer surface 165 of the fitment body 70. It can be desirable that the user can see the liquid composition 50 exiting the spout outlet 100 and that the timer 190 is in the same field of view as the spout outlet 100. Optionally, the timer 190 can be engaged with the fitment body 70 by being joined to the container body 20. The timer 190 can be joined to the fitment body 70 by being joined to an element that connects the timer 190 and the fitment body 70.

Flow Timer

Figure 8:
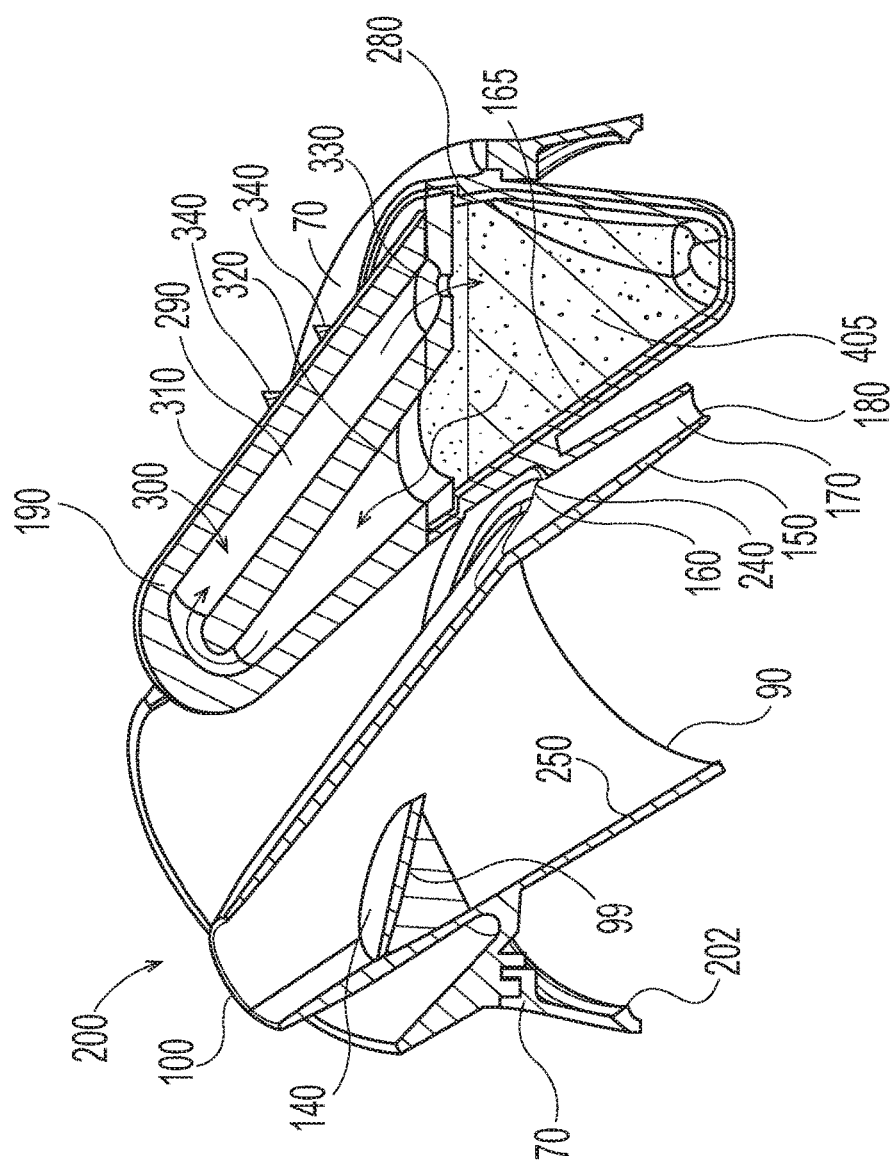
FIG. 8 is a cross section of a timer having a source reservoir and a collection reservoir.

The timer 190 can comprise a source reservoir 280 (FIG. 8). The timer 190 can further comprise a collection reservoir 290. The collection reservoir 290 can have an interior space 300 and an exterior surface 310. At least a portion of the interior space 300 can be visible from the exterior surface 310. A timer orifice 320 can connect the source reservoir 280 and the collection reservoir 290. The timer orifice 320 can be considered to provide fluid communication between the source reservoir 280 and the collection reservoir 290. The source reservoir 280 and collection reservoir 290 can be further connected to one another through an opening 330 connecting the collection reservoir 290 and the source reservoir 280. The opening 330 can be positioned away from the timer orifice 320. The timer orifice 320 can have a diameter of from about 0.2 mm to about 1.2 mm, optionally about 0.8 mm. The opening 330 can have a diameter from about 0.2 mm to about 4 mm, optionally about 1.6 mm. The opening 330 can provide for a pathway of fluid communication from the collection reservoir 290 back to the source reservoir 280 after liquid composition 50 is dispensed. The timer orifice 320 can have a perimeter from about 0.01 mm to about 1 mm. The timer orifice 320 can have a perimeter from about 0.01 mm to about 0.7 mm.

The timer orifice 320 can be sized and dimensioned to provide for a particular range of flow rates of the timer liquid 405. The open area of the timer orifice 320 can be set based on the length of time the designer wants to provide for liquid composition 50 dispensing from the container body 20. Since the flow rate of liquid composition 50 from the spout outlet 100 is a function of the size and shape of the spout inlet 90, spout outlet 100, geometry of the fitment 200 leading to the spout inlet 100, geometry of the open end 40 of the container body 20, geometry of partial obstruction 140, and the total head of the liquid composition 50, the designer can pick a desired quantity of liquid composition 50 to be dispensed and measure the length of time it takes for a quantity of such liquid to exit the spout outlet 100. Then the designer can compute the size of the open area of the timer orifice 320 such that flow of the timer liquid 405 from the source reservoir 280 to the collection reservoir 290 can be an indicator of the quantity of liquid composition 50 dispensed from the container body 20. The designer is also able to determine the quantity of timer liquid 405 to be provided in the timer 190.

As timer liquid 405 flows from the source reservoir 280 to the collection reservoir 290, air, or whatever other gas is within the timer 190, that is in the collection reservoir 290 can be displaced through the opening 330 as timer liquid 405 begins to fill the collection reservoir 290. The collection reservoir 290 can have a volume from about 0.4 cm³ to about 2 cm³, optionally from about 0.5 cm³ to about 1 cm³, optionally about 0.78 cm³.

With the fitment body 70 in the second position, once the timer liquid 405 reaches the desired dosing indicia 340, the user can transfer the fitment body 70 from the second position back to the first position. Timer liquid 405 can then drain back through the opening 330 into the source reservoir 280 or back through the timer orifice 320. The timer liquid 405 remains separate from the liquid composition 50 being dispensed and in use can move in a loop from the source reservoir 280, through the timer orifice 320, into the collection reservoir 290 up to a level of a dosing indicia 340, out of the collection reservoir 290 via the opening 330, and back into the source reservoir 280.

The timer liquid 405 can have a fixed volume or mass. The fixed volume of timer liquid 405 can be from about 0.5 cm³ to about 2 cm³, optionally from about 1.25 cm³. The timer liquid 405 can be contained in one or both of the source reservoir 280 and the collection reservoir 290. The timer liquid 405, the source reservoir 280, and the collection reservoir 290 are not in fluid communication with the spout inlet 90 or spout outlet 100. This enables functional separation of the timing aspect and the liquid composition 50 dispensing from the container body 20. Since liquid composition 50 flow from a container body 20 is dynamically complex, attempting to use a timer that is in liquid communication with contents of the container body 20 is complicated by the complex liquid flow regime from the container body 20. Further, venting of air back into the container body 20 may complicate measurement of volume of liquid composition 50 dispensed. Liquid composition 50 dispensing systems in which the timer/timer liquid 405 is in fluid communication with the spout inlet 90 or spout outlet 100 do not have the desired level of accuracy or precision for providing a particular quantity of liquid composition 50. For instance, one technical approach may be to divert a portion of the liquid composition 50 on its way towards the spout outlet 90 to a timer in which the liquid composition 50 accumulates in the timer as an indicator of the volume dispensed. This type of system is not accurate to the degree desired because of the complexity of proportionally routing liquid composition 50 out of the spout outlet 90 and to the timer. Further, the proportional routing may be function of the angle of pouring, which may reduce accuracy of the volume or mass of liquid composition 50 dispensed.

The timer liquid 405 can comprise glycerin, water, alcohol, or other substance that is liquid at a temperature from about 0 C to about 60 C.

Figure 9:
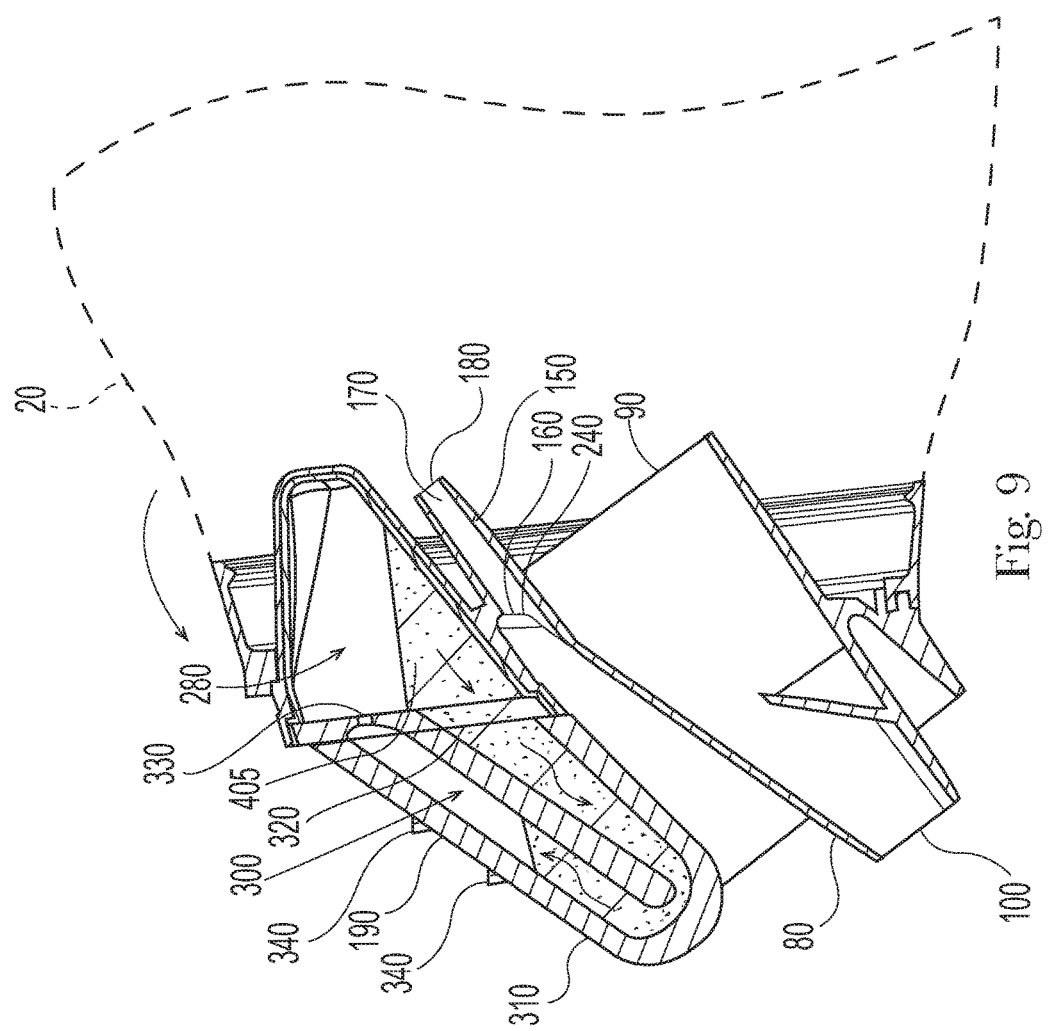
FIG. 9 is a cross section of a fitment and timer, the container body being in the second position to dispense liquid composition.

The fitment body 70 can be considered to have a first position in which the spout outlet 100 is above the spout inlet 90, as in FIG. 8, and a second position in which the spout inlet 90 is above the spout outlet 100, as in FIG. 9. When the fitment 200/fitment body 70 is in the first position, the collection reservoir 290 may be devoid of timer liquid 405. Or if there is timer liquid 405 in the collection reservoir 290, then that portion of the collection reservoir 290 may be rendered obscured or opaque so that the consumer cannot see the timer liquid 405. The first position of the fitment body 70 is in an upright position in which the fitment 200 which comprises the fitment body 70 is mounted to a container body 20 that this resting on its closed end 30 so that the fitment body 70 is above the container body 20. The timer 190 can be visible to the user regardless of whether the fitment 200/fitment body 70 is in the first position or second position.

When the fitment body 70 is in the second position a greater quantity of the timer liquid 405 can be in the collection reservoir 290 than when the fitment body 70 is in the first position. Further, in the second position, the timer liquid 405 can be visible from the exterior surface 310 of the collection reservoir 290. The second position of the fitment body 70 is in a tipped position so that the spout outlet 100 is below the spout inlet 90. In this position, liquid composition 50 can be dispensed from the spout outlet 100. The second position corresponds to the position of the fitment body 70 when a consumer tips or inverts a container body 20 to dispense liquid composition 50 from the container body 20.

In the first position, the spout outlet 100 can be above the spout inlet 90. In the second position the spout inlet 90 can be above the spout outlet 100. When the fitment body 70 is in the first position, the timer orifice 320 can be above the opening 330. When the fitment body 70 is transitioned from the first position to the second position, the timer orifice 320 can be below the opening 330 and as the fitment body 70 is transitioned from the first position to the second position the timer liquid 405 begins to move and continues to move from the source reservoir 280 to the collection reservoir 290 through the timer orifice 320. So long as there is timer liquid 405 above the timer orifice 320 and the total head on the source reservoir 280 side of the timer orifice 320 is greater than the total head on the collection reservoir 290 side of the timer orifice 320, timer liquid 405 will move from the source reservoir 280 to the collection reservoir 290. The timer orifice 320 can have a perimeter from about 0.01 mm to about 4 mm. The timer orifice 320 can have a perimeter from about 0.01 mm to about 1 mm. The timer orifice 320 can have a perimeter from about 0.01 mm to about 0.7 mm. The perimeter and shape of the timer orifice 320 can be chosen so that the timer liquid 405 flows through the timer orifice 320 at a flow rate that can be observed and tracked by the consumer pouring liquid composition 50 from the container body 20. The flow rate needs to be high enough, and set in regards to the size of the spout outlet 100 so that the duration of pouring is not too long so as not to become uncomfortable to the user. The duration of pour can be from about 2 s to about 10 s, optionally from about 4 s to about 7 s.

When the user dispenses liquid composition 50, the liquid composition 50 can flow from the spout outlet 100. To induce flow, the user tips the container body 20 to which the fitment 200/fitment body 70 is engaged to transition the fitment 200/fitment body 70 from the first position to the second position. The timer 190 can be positioned such that flow of the liquid composition 50 from the spout outlet 100 and the timer 190 are both visible to the user while dispensing. Once the timer liquid 405 reaches the level of the desired dosing indicia 340, which is indicative that the desired volume of liquid composition 50 has been dispensed, the user can upright the fitment body 70 to transition the fitment body 70 from the second position back to the first position. Timer liquid 405 that accumulated in the collection reservoir 290 can flow back into the source reservoir 280 via the opening 330. Thus the timer liquid 405 remains separate, or hydraulically independent, or not in fluid communication with the liquid composition 50. That is, the timer liquid 405 is decoupled from the liquid composition 50.

The collection reservoir 290 can comprise at least one dosing indicia 340 visible on the exterior surface 310. The dosing indicia 340 can be, by way of nonlimiting example, a raised portion of the exterior surface 310, a printed mark on the exterior surface 310, a pigmented or dyed portion of the collection reservoir 290, or a printed marked on the interior surface of the collection reservoir 290. The dosing indicia 340 can be indicative of a volume of liquid composition 50 dispensed out the spout outlet 100 that corresponds to a recommended dose of liquid composition 50. Multiple dosing indicia 340 can be provided as part of the collection reservoir 290.

Figure 10:
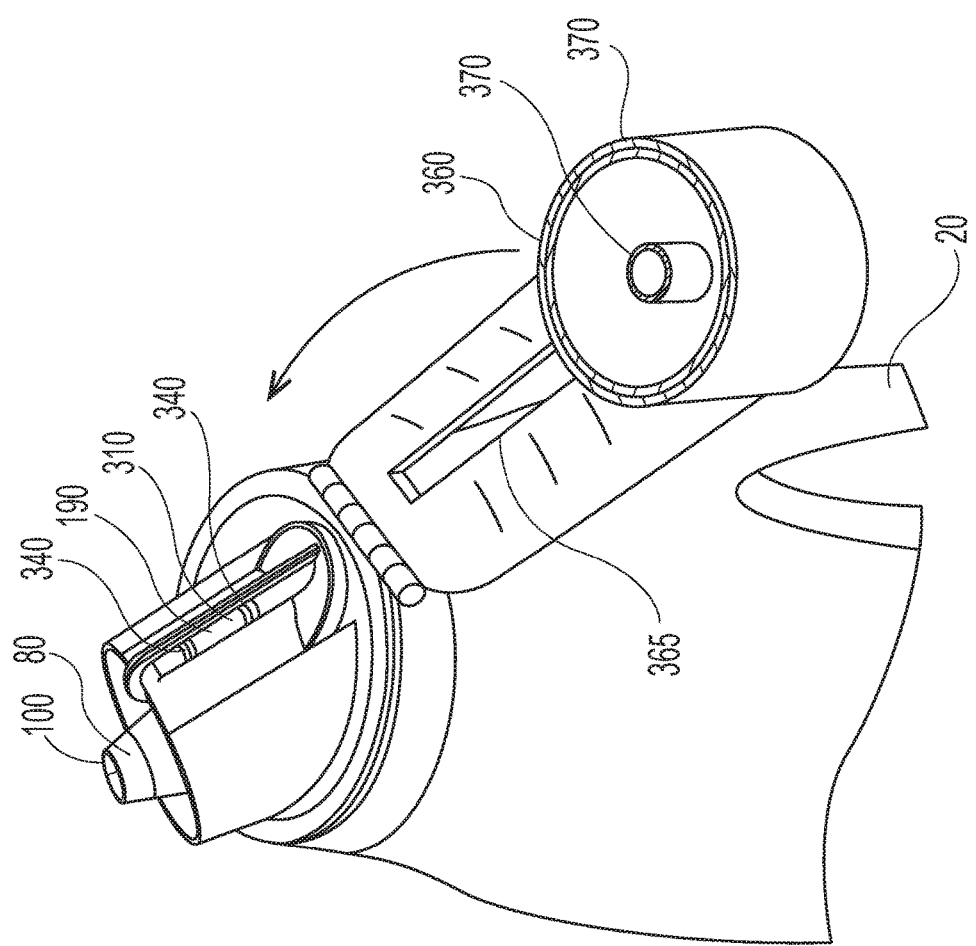
FIG. 10 is a container having a closure.

The fitment 200 can further comprise a closure 360 engaged with the spout outlet 100 or covering the spout outlet 100, by way of non-limiting example as shown in FIG. 10. Optionally, the closure 360 can be engaged with the spout outlet 100 or other portion of the fitment body 70 to close both the spout outlet 100 and the drain back channel 230/vent 150. The closure 360 helps to prevent spillage of liquid composition 50 from the container body 20 in the event that the container body 20 is unintentionally tipped. The closure 360 can be a hinged closure 360. Optionally, the hinged closure 360 can have a window 365 through which the timer 190 is visible when the closure 360 is in a position in which the spout outlet 100 is closed. The window 365 can be practical for enabling the consumer to observe that the fitment 200 has a timer 190 when the container 10 is presented to the consumer in a store or online. Without a window 365, the existence of the timer 190 may not be apparent to the consumer prior to using the container 10. The window 365 can be an opening in the closure 360. Optionally the window 365 can be a translucent portion of the closure 360.

The closure 360 can comprise one or more plug seals 370. The plug seal 370 or plug seals 370 can close the spout outlet 100 and or the drain back channel 230/vent 150.

Density Timer

Figure 11:
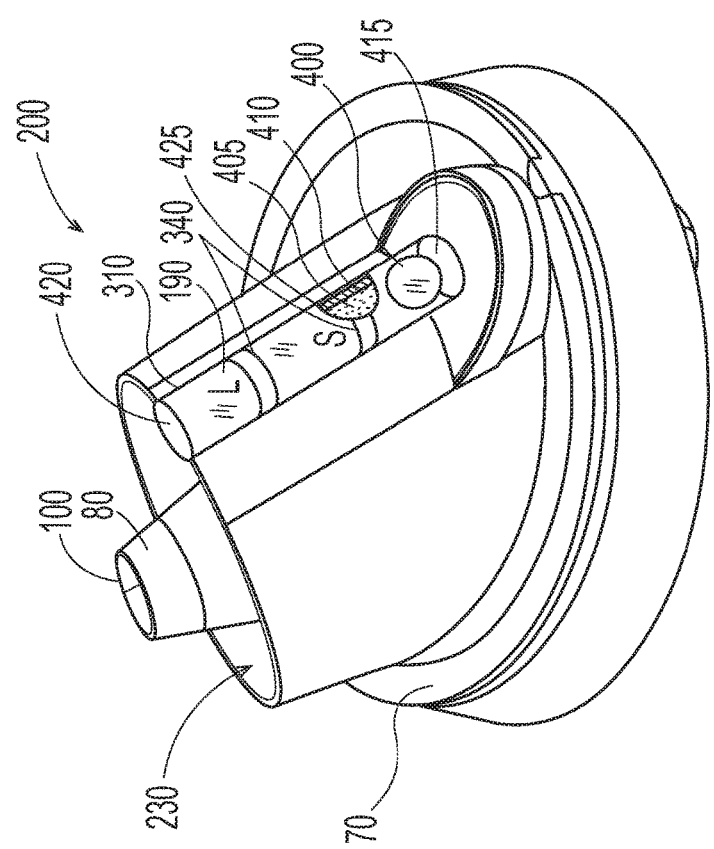
FIG. 11 is a fitment having a timer that operates on the principle of a contrast in density of the timer element and timer liquid.

The timer 190 can be one that operates on the principle of a contrast between the density of a timer element 400 positioned in a timer liquid 405 and movement of the timer element 400 through the timer liquid 405 driven by either the force of gravity or the buoyant force of the timer element 400 in the timer liquid 405 (FIG. 11). The principle of operation of the timer 190 can be the amount of time that it takes for a timer element 400 that is denser than the timer liquid 405 to fall under the force of gravity a given distance through the timer liquid 405. In another option, the principle of operation of the timer 190 can be the amount of time that it takes for a timer element 400 that is less dense than the timer liquid 405 to rise under the buoyant force a given distance through the timer liquid 405. Stokes law or other analytical or computational approach can be used to model movement of the timer element 400 through the timer liquid 405 to size and dimension the components of the timer 190 appropriately.

The timer 190 can comprise a timer chamber 410 containing a timer liquid 405 having a first density and timer element 400 having a second density. The second density can differ from the first density. The contrast in density between the timer liquid 405 and timer element 400 provides for either the tendency of the timer element 400 to sink in the timer liquid 405 or float in the timer liquid 405.

The timer element 400 can be moveable through the timer liquid 405. Movement of the timer element 400 can be driven, by way of nonlimiting example, by the buoyant force or gravitational force on the timer element 400.

The timer element 400 is in the timer chamber 410. The timer element 400 is visible from outside the timer chamber 410. This provides for the user of the fitment 200 to be able to see movement of the timer element 400 within the timer chamber 410 as liquid composition 50 is dispensed from the spout outlet 100.

One or more dosing indicia 340 can be positioned on or adjacent the timer chamber 410. The dosing indicia 340 can be printed lines. The dosing indicia 340 can be raised marks, for instance lines, dots, arrows, and the like, or depressions, for instance etch marks, divots, arrows, and the like, on or in the timer chamber 410. There can be a single dosing indicia 340 if the desired volume or mass of dose has a single value or is a whole number multiple of such dose. There can be a plurality of dosing indicia 340 if there is more than one desired volume or mass of dose depending on the use of the liquid composition 50. For instance, the dosing indicia 340 can be S, M, L, representative of small, medium, and large doses, respectively, or numbered, for example, as 1, 2, and 3.

The timer liquid 405 can be water. The timer liquid 405 can be provided with an antimicrobial substance to reduce or prevent biological growth in the timer liquid 405. The timer liquid 405 can be a liquid that has inherent antimicrobial properties. The timer liquid 405 can be ethanol, methanol, and mixtures thereof. The timer liquid 405 can be an oil such as sunflower oil, corn oil, olive oil, motor oil, or the like. The timer liquid 405 need only to have a viscosity low enough so that the timer element 400 can move through the timer liquid 405 under the applied force from gravity or buoyancy.

The timer element 400 can be a sphere. The timer element 400 can have a density greater than the density of the timer liquid 405. In such an arrangement, when the fitment 200 or fitment body 70 is in the first position, in which liquid composition 50 is not being dispensed, the timer element 400 will be resting at the first end 415 of the timer chamber 410. When the fitment 200/fitment body 70 is transitioned from the first position to the second position, the second position being the position of the fitment 200/fitment body 70 when liquid composition 50 is dispensed from the container 10, the timer element 400 can fall through the timer liquid 405 passing and or approaching one or more dosing indicia 340. The timer element 400 can move through the timer liquid 405 from the first end 415 towards or to the second end 420 and towards or past the dosing indicia 340. As the user of the fitment 200 observes the position of the timer element 400 relative to the dosing indicia 340 as the timer element 400 falls through the timer liquid 405, the user can decide to cease dispensing of the liquid composition 50 by tipping the fitment 200 upright when the timer element 400 is at or past a selected dosing indicia 340.

As described herein, the timer chamber 410 can have a first end 415, a second end 420 opposing the first end 415, and a timer chamber wall 425 connecting the first end 415 to the second end 420. The timer chamber wall 425 defines a timer chamber 410 containing the timer liquid 405.

The timer element 400 can also move when driven by a buoyant force. In such an arrangement, the timer element 400 can have a density less than the timer liquid 405. When the fitment 200/fitment body 70 is in the first position, the timer element 400 will be resting at the second end 420 of the timer chamber 410. When the fitment 200/fitment body 70 is transitioned from the first position to the second position, the timer element 400 can rise through the timer liquid 405 passing and or approaching one or more dosing indicia 340. The timer element 400 can move through the timer liquid 405 from the second end 420 towards or to the first end 415 and towards or past the dosing indicia 340. The user can decide to cease dispensing of the liquid composition 50 by up righting the fitment 200 when the timer element 400 is at or past a selected dosing indicia 340.

The density of the timer element 400 is the mass of the timer element 400 divided by the volume of timer liquid 405 displaced. The timer element 400 can be a solid. For instance, the timer element 400 can be a nonporous solid plastic, ceramic, wax, or metal, or other material having a specific gravity or density greater than the specific gravity or density of the timer liquid 405 for an embodiment in which the timer element 400 moves under the force of gravity when the fitment 200/fitment body 70 is in the second position. Optionally, the timer element 400 can be a porous solid plastic, ceramic, or metal, or other material having sufficient mass per volume of timer liquid 405 displaced greater than the density of the timer liquid 405.

The timer element 400 can be a porous solid plastic, solid plastic, ceramic, wax, or metal, or other material having a density less than the density of the timer liquid 405 for an embodiment in which the timer element 400 moves under the buoyant force acting on the timer element 400 when the fitment 200/fitment body 70 is in the second position. The timer element 400 can be hollow. The timer element 400 can be a solid material having a specific gravity or density less than the specific gravity or density of the timer liquid 405. For instance, the timer element 400 can be a solid plastic ball.

The timer element 400 can be a liquid. The timer element 400 can be an oil or other liquid material having a density greater than the density of the timer liquid 405, for instance if the timer element 400 is meant to move under the force of gravity from the first end 415 towards the second end 420 when the fitment 200/fitment body 70 is in the second position. The timer element 400 can be an oil or other liquid material having a density less than the density of the timer liquid 405, for instance if the timer element 400 is meant to move under the buoyant force acting on the timer element 400 when the fitment 200/fitment body 70 is in the second position. A variety of oils and other liquid materials are available in different densities and the desired contrast in density of the timer element 400 and the timer liquid 405 can provided for. Such materials can desirably be ones that tend to remain in a clump.

Desirably, the timer element 400 can be visible from outside the timer chamber 410. The user of the fitment 200 can see the timer element 400 move to or past the one or more dosing indicia 340 as liquid composition 50 is dispensed from the fitment 200. To provide for enhanced visibility of the timer element 400, there can be a contrast in color between the timer element 400 and the timer liquid 405. For instance, the timer liquid 405 can be from about 98% to about 100% by weight water. The timer element 400 can be a red solid plastic ball having a density or net density greater than 1 g/cm$^3$.

The timer chamber wall 425 can be fabricated from a clear plastic material. For instance, the timer chamber wall 425 can be formed of acrylic, polypropylene, polyethylene, polyethylene terephthalate, and like materials.

Providing a timer 190 as described herein can be practical since the timer 190, or timer liquid 405, is hydraulically isolated from the exit 180 and spout outlet 100. Said otherwise, the timer 190 or timer liquid 405 can be free of fluid communication between the timer 190 and exit 180 and the spout inlet 90. The timer 190 can be engaged with the fitment body 70. The timer 190 can be engaged with the fitment body 70 by being mounted on an outer surface 165 of the fitment body 70. The timer 190 can be engaged with the fitment body 70 by being joined to the container body 20. The timer 190 can be joined to the fitment body 70 by being joined to an element that connects the timer 190 and the fitment body 70.

The timer liquid 405 can have a fixed volume. The fixed volume of timer liquid 405 can be from about 0.5 cm$^3$ to about 4 cm$^3$, optionally from about 0.5 cm$^3$ to about 2 cm$^3$.

The timer liquid 405 is not in fluid communication with the exit 180, spout inlet 90, or spout outlet 100. Or, stated otherwise, the timer liquid 405 can be fluidly decoupled from the exit 180, spout inlet 90, or spout outlet 100. This enables functional separation of the timing aspect and the liquid composition 50 dispensing from the container body 20. Since liquid flow from a container body 20 is dynamically complex, attempting to use a timer 190 that is in liquid communication with contents of the container body 20 is complicated by the complex liquid flow regime from the container body 20. Further, venting of air back into the container body 20 may complicate measurement of volume of liquid composition 50 dispensed. The fitment 200/fitment body 70 can be considered to have a first position in which the spout outlet 100 is above the spout inlet 90 and a second position in which the spout inlet 90 is above the spout outlet 100. If the timer element 400 is buoyant within the timer liquid 405, the timer element 400 will be at or near the second end 420 of the timer chamber 410 when the fitment 200/fitment body 70 is in the first position. If the timer element 400 has a density greater than the timer liquid 405, the timer element 400 will be at or near the first end 415 of the reservoir 410 when the fitment 200/fitment body 70 is in the first position. The first position of the fitment 200/fitment body 70 is in an upright position in which the fitment 200/fitment body 70 is mounted to a container body 20 that is resting on its closed end 30 so that the fitment 200 is above the container body 20.

The second position of the fitment 200/fitment body 70 is in a tipped position so that the spout outlet 100 is below the spout inlet 90. In this position, liquid composition 50 can be dispensed from the spout outlet 100. The second position corresponds to the position of the fitment 200/fitment body 70 when a consumer tips or inverts a container body 20 to dispense liquid composition 50 from the container body 20.

In the first position the spout outlet 100 can be above the spout inlet 90. In the second position the spout inlet 90 can be above the spout outlet 100. The contrast in density of the timer liquid 405 and the timer element 400 can be chosen so that the timer element 400 moves through the timer liquid 405 at a rate that can be observed and tracked by the consumer pouring liquid composition 50 from the container body 20. The rate of movement needs to be high enough, and set in regards to the size of the spout outlet 100 so that the duration of pouring is not too long so as not to become uncomfortable to the consumer or too short to reduce the potential for an inaccurate dose of liquid composition 50. The duration of pour can be from about 2 s to about 10 s, optionally from about 4 s to about 7 s.

The timer chamber 410 or a portion of the fitment 200 adjacent the timer chamber 410 can comprise at least one dosing indicia 340. The dosing indicia 340 can be a raised portion of the exterior surface 310 of the timer chamber wall 425, a printed mark on the exterior surface 310 of the timer chamber wall 425, a pigmented or dyed portion of the timer chamber wall 425, or a printed marked on the interior surface or exterior surface 310 of the timer chamber wall 425. The dosing indicia 340 can be indicative of a volume of liquid dispensed out the spout outlet 100 that corresponds to a recommended dose of liquid composition 50. Multiple dosing indicia 340 can be provided.

Electronic Timer

Figure 12:
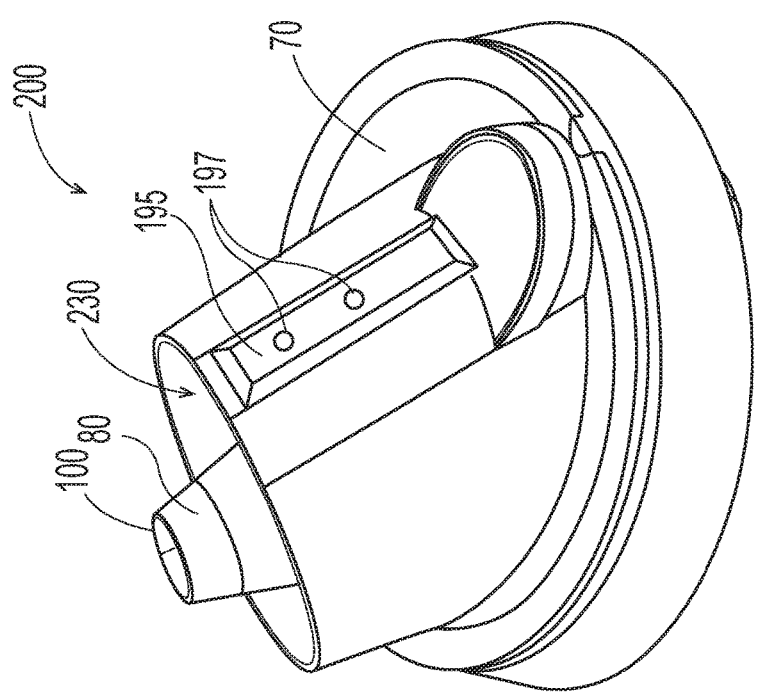
FIG. 12 is a fitment having a position activated electronic timer.

The timer 190 can be a position activated electronic timer 195 (FIG. 12). A position activated electronic timer 195 is a timer in which the timing interval starts when the timer 190 is transitioned from a first position to a second position and stops when the timer 190 is transitioned from the second position to the first position. The electronic timer 195 can comprise one or more lights 197, for example light emitting diodes. A light 197 can be an indicator that the elapsed time from transitioning the fitment 200 from the first position to the second position is sufficient for dispensing a desired volume or mass of liquid composition 50. For example, the position activated timer 195 may be in a rest state. Upon transitioning the fitment 200/fitment body 70 from the first position to the second position, the timing circuit of the position activated electronic timer 195 can be activated and a light 197, for example a green light emitting diode, can indicate to the user the fitment 200/fitment body 70 is in the proper position to dispense liquid composition 50. After a period of time associated with a volume or mass of liquid composition 50 dispensed, the light 197 may turn off and or another light 197, for example a red light emitting diode, can turn on to indicate to the user that the desired or specified quantity of liquid composition 50 was dispensed and that the user should transition the fitment 200/fitment body 70 from the second position back to the first position to stop dispensing liquid composition 50. The position activated timer 195 may at that time shut down. The position activated electronic timer 195 may be battery powered or photovoltaic powered.

The electronic timer 195 can provide an audible indication that the container body is tipped to an appropriate position to dispense liquid composition 50 and the same or a distinct audible signal that an appropriate amount of time has elapsed so that an appropriate volume liquid composition 50 has been dispensed.

Figure 13:
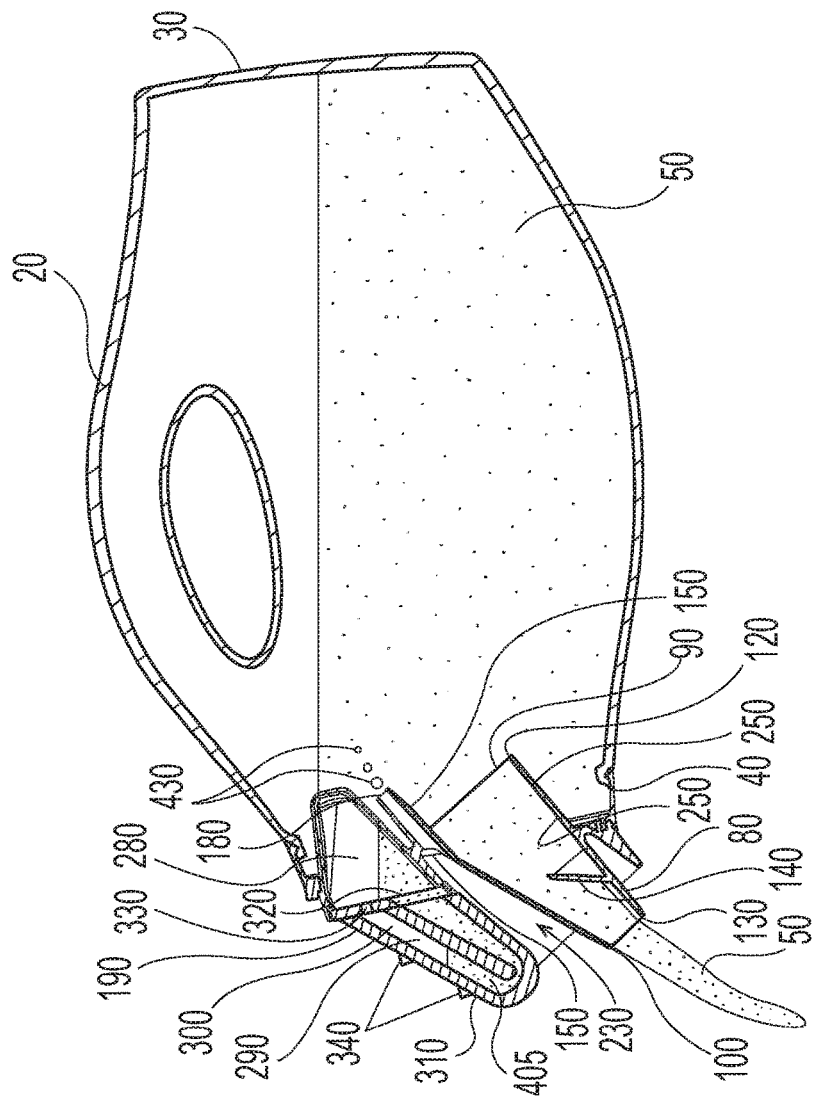
FIG. 13 illustrates a container dispensing liquid composition.

An illustration of the container 10 dispensing liquid composition 50 is shown in FIG. 13. As shown in FIG. 13, the fitment 200/fitment body 70 is in the second position. Liquid composition 50 is flowing out of the spout 80. Timer liquid 405 is accumulating in the collection reservoir 290 and approach a dosing indicia 340. Liquid composition 50 dispensed from the container body 20 is replaced with air that is entering the vent 150. Since the exit 180 is small, liquid composition 50 does not enter the vent 150. Capillary forces within the liquid composition 50 can provide for resistance to the liquid composition 50 entering the exit 180 and the total head of liquid composition 50 on the exit 180 can be small. Air bubbles 430 enter the container body 20. The air bubbles 430 desirably enter the container body 20 at a regular rate of the total quantity per time of air at ambient pressure so that flow of liquid composition 50 out of the container body 20 is steady. This can yield a volume of liquid composition 50 dispensed that is a function of time, with time being measured by the user using the timer 190.

An example is below:

A. A fitment (200) comprising:
   a fitment body (70);
   a peripheral mount (202) engaged with said fitment body, wherein said peripheral mount has a mounting plane (205);
   a spout (80) having an upstream spout inlet (90) and a downstream spout outlet (100) and a spout wall (110) extending from said spout inlet to said spout outlet, wherein said spout inlet has a spout inlet invert (120) and said spout outlet has a spout outlet invert (120) and a straight line connecting said spout inlet invert and said spout outlet invert is oriented at an angle from about 10 to about 85 degrees above said mounting plane;
   an immobile partial obstruction (140) in line with and upstream of said spout outlet;
   a vent (150) comprising an entrance (160) spaced apart from said spout outlet and a vent wall (170) extending from said entrance to an exit (180), wherein said exit is in fluid communication with said spout inlet; and a timer (190) engaged with said fitment body, wherein said timer comprises a closed system containing a fixed volume of timer liquid (405);

wherein said fitment further comprises a floor (210) extending at least partially around said spout and outwardly away from said spout and a channel wall (220) extending from said floor in a direction away from said spout inlet to define a drain back channel (230) between said spout and said channel wall, wherein said floor is sloped to said entrance or to a hole (240) in fluid communication with said spout inlet.

B. The fitment according to Paragraph A, wherein said partial obstruction is in said spout between said spout inlet and said spout outlet.

C. The fitment according to any of Paragraph A or B, wherein said spout has an invert interior contour (250) extending from said spout inlet invert to said spout outlet invert and said partial obstruction is along said invert interior contour.

D. The fitment according to any of Paragraphs A to C, wherein said partial obstruction presents a substantially flat surface (99) towards said spout inlet.

E. The fitment according to any of Paragraphs A to D, wherein said spout comprises a plurality of full interior sections (245) parallel to said mounting plane between said spout inlet and said spout outlet and said full interior sections not inclusive of said partial obstruction decrease in full interior section area from said spout inlet to said spout outlet.

F. The fitment according to any of Paragraphs A to E, wherein said spout outlet has a spout outlet perimeter (260), wherein said exit is more than about 0.5 times said spout outlet perimeter away from said partial obstruction, and wherein said exit has an exit perimeter and said spout outlet perimeter is more than about 2 times greater than said exit perimeter.

G. The fitment according to any of Paragraphs A to F, wherein said straight line connecting said spout inlet invert and said spout outlet invert is oriented at an angle from about 50 to about 80 degrees above said phreatic surface.

H. The fitment according to any of Paragraphs A to G, wherein said timer comprises:

a source reservoir (280);

a collection reservoir (290) having an interior space (300) and an exterior surface (310), wherein at least a portion of said interior space is visible from said exterior surface;

a timer orifice (320) connecting said source reservoir and said collection reservoir; and an opening (330) connecting said collection reservoir and said source reservoir positioned away from said timer orifice;

wherein said timer liquid is contained in one or both of said source reservoir and said collection reservoir.

I. The fitment according to Paragraph H, wherein said fitment has a first position in which said spout outlet is above said spout inlet and a second position in which said spout inlet is above said spout outlet, wherein when said fitment is in said second position a greater quantity of said timer liquid is in said collection reservoir than when said fitment is in said first position, and wherein when said fitment is in said second position said timer liquid is visible from said exterior surface.

J. The fitment according to Paragraph H or I, wherein said collection reservoir comprises at least one dosing indicia (340) visible from said exterior surface.

K. The fitment according to any of Paragraphs A to J, wherein said spout has a shape selected from the group consisting of: a truncated oblique circular cone, a truncated right circular cone, a truncated generalized oblique cone, and a truncated generalized right cone.

L. The fitment according to any of Paragraphs A to G, wherein:

said timer comprises a timer chamber (410) containing said timer liquid and a timer element (400);

said timer liquid has a first density and said timer element has a second density;

said second density differs from said first density;

said timer element is movable through said timer liquid;

said timer element is visible from outside said timer chamber; and one or more dosing indicia are on or adjacent said timer chamber.

M. The fitment according to Paragraph L, wherein said timer chamber comprises a first end (415), a second end (420) opposing said first end, and a timer chamber wall (425) connecting said first end to said second end, said timer chamber wall defining said timer chamber containing said timer liquid, wherein said timer chamber from said first end to said second end is aligned with said spout from said spout inlet to said spout outlet.

N. The fitment according to Paragraph L or M, wherein said second density is greater than said first density.

O. The fitment according to Paragraphs L to N, wherein said fitment has a first position in which said spout outlet is above said spout inlet and a second position in which said spout inlet is above said spout outlet, wherein when said fitment is transitioned from said first position to said second position said timer element moves through said timer liquid from said first end towards said second end or moves through said timer liquid from said second end towards said first end.

P. The fitment according to any of Paragraphs A to O, wherein said peripheral mount is engaged with an open end (40) of a container body (20).

Q. The fitment according to any of Paragraphs A to P, wherein said fitment further comprises a closure engaged with said spout outlet or covering said spout outlet.

R. A fitment (200) comprising:

a fitment body (70);

a peripheral mount (202) engaged with said fitment body, wherein said peripheral mount has a mounting plane (205);

a spout (80) having an upstream spout inlet (80) and a downstream spout outlet (90) and a spout wall (110) extending from said spout inlet to said spout outlet, wherein said spout inlet has a spout inlet invert (120) and said spout outlet has a spout outlet invert (130) and a straight line connecting said spout inlet invert and said spout outlet invert is oriented at an angle from about 10 to about 85 degrees above said mounting plane;

an immobile partial obstruction (140) in line with and upstream of said spout outlet;

a vent (150) comprising an entrance (160) spaced apart from said spout outlet and a vent wall (170) extending from said entrance to an exit (180), wherein said exit is in fluid communication with said spout inlet; and a timer (190) engaged with said fitment body, wherein said timer comprises a closed system containing a fixed volume of timer liquid (405).

S. The fitment according to Paragraph R, wherein said straight line connecting said spout inlet invert and said spout outlet invert is oriented at an angle from about 50 to about 80 degrees above said phreatic surface.

T. A fitment (200) comprising:
a fitment body (70);
a peripheral mount (202) engaged with said fitment body, wherein said peripheral mount has a mounting plane (205);
a spout (80) having an upstream spout inlet (90) and a downstream spout outlet (100) and a spout wall (110) extending from said spout inlet to said spout outlet, wherein said spout inlet has a spout inlet invert (120) and said spout outlet has a spout outlet invert (130) and a straight line connecting said spout inlet invert and said spout outlet invert is oriented at an angle from about 10 to about 85 degrees above said mounting plane;
an immobile partial obstruction (140) in line with and upstream of said spout outlet;
a vent (150) comprising an entrance (160) spaced apart from said spout outlet and a vent wall (170) extending from said entrance to an exit (180), wherein said exit is in fluid communication with said spout inlet; and
a timer (190) engaged with said fitment body, wherein said timer comprises a closed system containing a fixed volume of timer liquid (405).

U. The fitment according to Paragraph S, wherein said spout outlet has a spout outlet perimeter (260), wherein said exit is more than about 0.5 times said spout outlet perimeter away from said partial obstruction, and wherein said exit has an exit perimeter (270) and said spout outlet perimeter is more than about 2 times greater than said exit perimeter.

V. The fitment according to Paragraph T or U, wherein said straight line connecting said spout inlet invert and said spout outlet invert is oriented at an angle from about 50 to about 80 degrees above said phreatic surface.

W. A fitment (200) comprising:
a fitment body (70);
a peripheral mount (202) engaged with said fitment body, wherein said peripheral mount has a mounting plane (205);
a spout (80) having an upstream spout inlet (90) and a downstream spout outlet (100) and a spout wall (110) extending from said spout inlet to said spout outlet, wherein said spout inlet has a spout inlet invert (120) and said spout outlet has a spout outlet invert (130) and a straight line connecting said spout inlet invert and said spout outlet invert is oriented at an angle from about 10 to about 85 degrees above said mounting plane;
an immobile partial obstruction (140) in line with and upstream of said spout outlet;
a vent (150) comprising an entrance (160) spaced apart from said spout outlet and a vent wall (170) extending from said entrance to an exit (180), wherein said exit is in fluid communication with said spout inlet; and
a timer (190) engaged with said fitment body, wherein said timer comprises a position activated electronic timer (195);
wherein said fitment further comprises a floor (210) extending at least partially around said spout and outwardly away from said spout and a channel wall (220) extending from said floor in a direction away from said spout inlet to define a drain back channel (230) between said spout and said channel wall, wherein said floor is sloped to said entrance or to a hole (240) in fluid communication with said spout inlet.

X. The fitment according to Paragraph U, wherein said timer comprises one or more lights (197).

Y. The fitment according to Paragraphs W or X, wherein said straight line connecting said spout inlet invert and said spout outlet invert is oriented at an angle from about 50 to about 80 degrees above said phreatic surface.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A fitment comprising:
a fitment body;
a peripheral mount engaged with said fitment body, wherein said peripheral mount has a mounting plane;
a spout having an upstream spout inlet and a downstream spout outlet and a spout wall extending from said spout inlet to said spout outlet, wherein said spout inlet has a spout inlet invert and said spout outlet has a spout outlet invert and a straight line connecting said spout inlet invert and said spout outlet invert is oriented at an angle from about 10 to about 85 degrees above said mounting plane;
an immobile partial obstruction in line with and upstream of said spout outlet;
a vent comprising an entrance spaced apart from said spout outlet and a vent wall extending from said entrance to an exit, wherein said exit is in fluid communication with said spout inlet; and
a timer engaged with said fitment body, wherein said timer comprises a closed system containing a fixed volume of timer liquid;
wherein said fitment further comprises a floor extending at least partially around said spout and outwardly away from said spout and a channel wall extending from said floor in a direction away from said spout inlet to define a drain back channel between said spout and said channel wall, wherein said floor is sloped to said entrance or to a hole in fluid communication with said spout inlet.

2. The fitment according to claim 1, wherein said partial obstruction is in said spout between said spout inlet and said spout outlet.

3. The fitment according to claim 1, wherein said spout has an invert interior contour extending from said spout inlet invert to said spout outlet invert and said partial obstruction is along said invert interior contour.

4. The fitment according to claim 3, wherein said partial obstruction presents a substantially flat surface (99) towards said spout inlet.

5. The fitment according to claim 3, wherein said spout comprises a plurality of full interior sections parallel to said mounting plane between said spout inlet and said spout outlet and said full interior sections not inclusive of said partial obstruction decrease in full interior section area from said spout inlet to said spout outlet.

6. The fitment according to claim 1, wherein said spout outlet has a spout outlet perimeter, wherein said exit is more than about 0.5 times said spout outlet perimeter away from said partial obstruction, and wherein said exit has an exit perimeter and said spout outlet perimeter is more than about 2 times greater than said exit perimeter.

7. The fitment according to claim 1, wherein said timer comprises:
 a source reservoir;
 a collection reservoir having an interior space and an exterior surface, wherein at least a portion of said interior space is visible from said exterior surface;
 a timer orifice connecting said source reservoir and said collection reservoir; and
 an opening connecting said collection reservoir and said source reservoir positioned away from said timer orifice;
 wherein said timer liquid is contained in one or both of said source reservoir and said collection reservoir.

8. The fitment according to claim 7, wherein said fitment has a first position in which said spout outlet is above said spout inlet and a second position in which said spout inlet is above said spout outlet, wherein when said fitment is in second position a greater quantity of said timer liquid is in said collection reservoir than when said fitment is in said first position, and wherein when said fitment is in said second position said timer liquid is visible from said exterior surface.

9. The fitment according to claim 8, wherein said collection reservoir comprises at least one dosing indicia visible from said exterior surface.

10. The fitment according to claim 1, wherein said spout has a shape selected from the group consisting of: a truncated oblique circular cone, a truncated right circular cone, a truncated generalized oblique cone, and a truncated generalized right cone.

11. The fitment according to claim 1, wherein:
 said timer comprises a timer chamber containing said timer liquid and a timer element;
 said timer liquid has a first density and said timer element has a second density;
 said second density differs from said first density;
 said timer element is movable through said timer liquid;
 said timer element is visible from outside said timer chamber; and
 one or more dosing indicia are on or adjacent said timer chamber.

12. The fitment according to claim 11, wherein said timer chamber comprises a first end, a second end opposing said first end, and a timer chamber wall connecting said first end to said second end, said timer chamber wall defining said timer chamber containing said timer liquid, wherein said timer chamber from said first end to said second end is aligned with said spout from said spout inlet to said spout outlet.

13. The fitment according to claim 12, wherein said second density is greater than said first density.

14. The fitment according to claim 12, wherein said fitment has a first position in which said spout outlet is above said spout inlet and a second position in which said spout inlet is above said spout outlet, wherein when said fitment is transitioned from said first position to said second position said timer element moves through said timer liquid from said first end towards said second end or moves through said timer liquid from said second end towards said first end.

15. The fitment according to claim 1, wherein said peripheral mount is engaged with an open end of a container.

16. The fitment according to claim 1, wherein said fitment further comprises a closure engaged with said spout outlet or covering said spout outlet.

17. The fitment according to claim 16, wherein said fitment forms at least part of a container closure system.

18. A fitment comprising:
 a fitment body;
 a peripheral mount engaged with said fitment body, wherein said peripheral mount has a mounting plane;
 a spout having an upstream spout inlet and a downstream spout outlet and a spout wall extending from said spout inlet to said spout outlet, wherein said spout inlet has a spout inlet invert and said spout outlet has a spout outlet invert and a straight line connecting said spout inlet invert and said spout outlet invert is oriented at an angle from about 10 to about 85 degrees above said mounting plane;
 an immobile partial obstruction in line with and upstream to said spout outlet;
 a vent comprising an entrance spaced apart from said spout outlet and a vent wall extending from said entrance to an exit, wherein said exit is in fluid communication with said spout inlet; and
 a timer engaged with said fitment body, wherein said timer comprises a closed system containing a fixed volume of timer liquid.

19. The fitment according to claim 18, wherein said spout outlet has a spout outlet perimeter, wherein said exit is more than about 0.5 times said spout outlet perimeter away from said partial obstruction, and wherein said exit has an exit perimeter and said spout outlet perimeter is more than about 2 times greater than said exit perimeter.

20. A fitment comprising:
 a fitment body;
 a peripheral mount engaged with said fitment body, wherein said peripheral mount has a mounting plane;
 a spout having an upstream spout inlet and a downstream spout outlet and a spout wall extending from said spout inlet to said spout outlet, wherein said spout inlet has a spout inlet invert and said spout outlet has a spout outlet invert and a straight line connecting said spout inlet invert and said spout outlet invert is oriented at an angle from about 10 to about 85 degrees above said mounting plane;
 an immobile partial obstruction in line with and upstream to said spout outlet;

a vent comprising an entrance spaced apart from said spout outlet and a vent wall extending from said entrance to an exit, wherein said exit is in fluid communication with said spout inlet; and a timer engaged with said fitment body, wherein said timer comprises a position activated electronic timer;

wherein said fitment further comprises a floor extending at least partially around said spout and outwardly away from said spout and a channel wall extending from said floor in a direction away from said spout inlet to define a drain back channel between said spout and said channel wall, wherein said floor is sloped to said entrance or to a hole in fluid communication with said spout inlet.

* * * * *